United States Patent
Kuroyanagi et al.

(10) Patent No.: US 6,433,900 B1
(45) Date of Patent: *Aug. 13, 2002

(54) OPTICAL WAVELENGTH MULTIPLEXING SYSTEM HAVING A REDUNDANT CONFIGURATION

(75) Inventors: Satoshi Kuroyanagi; Tetsuya Nishi; Ichiro Nakajima; Takuji Maeda; Isao Tsuyama, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/229,863

(22) Filed: Mar. 1, 1999

(30) Foreign Application Priority Data

Feb. 20, 1998 (JP) .......................................... 10-038482

(51) Int. Cl.⁷ .............................................. H04B 10/08
(52) U.S. Cl. ....................... 359/110; 359/114; 359/124; 359/117; 359/125; 359/128; 359/139; 359/161
(58) Field of Search ................................ 359/110, 114, 359/124, 125, 128, 117, 161, 139

(56) References Cited

U.S. PATENT DOCUMENTS

| | | | | |
|---|---|---|---|---|
| 5,457,556 A | * | 10/1995 | Shiragaki | 359/117 |
| 5,479,396 A | * | 12/1995 | Kusano | 370/16 |
| 5,805,320 A | * | 9/1998 | Kuronayagi et al. | 359/117 |
| 5,937,117 A | * | 8/1999 | Ishida et al. | 385/24 |
| 5,949,563 A | * | 9/1999 | Takada | 359/124 |
| 6,061,156 A | * | 5/2000 | Takeshita et al. | 359/117 |
| 6,072,610 A | * | 6/2000 | Kuronayagi et al. | 359/117 |
| 6,163,527 A | * | 12/2000 | Ester et al. | 370/228 |
| 6,205,562 B1 | * | 3/2001 | Fukushima et al. | 714/43 |

FOREIGN PATENT DOCUMENTS

| | | |
|---|---|---|
| JP | 56-112143 | 9/1981 |
| JP | 2-076497 | 3/1990 |
| JP | 6-097884 | 4/1994 |
| JP | 6-303192 | 10/1994 |

OTHER PUBLICATIONS

H. Kuzukami, et al. "Compact 2.4Gb/s Optical Transmitter Module" A. Yasuda, et al. 2.3Gb/s Optical Receiver Module, Proceedings of the 1996 Communications Society Conference of IEICE, Communications Society and The Institute of Electronics, Information and Communication Engineers; Sep. 18, 1996; B–1057 2. Constitution B–1058 2. Constitution.

Ippei Sawaki, et al. "Rectangularly Configured 4x4 Ti:LiNbO Matrix Switch with Low Drive Voltage" IEEE Journal on Selected Areas in Communications, vol. 6 No. 7 The IEEE Communications Society; Aug. 1988; pp. 1267–1272.

T. Nakazawa, et al. "Development of Lithium–Niobate Tunable Filters" IEICE Technical Report, The Institute of Electronics, Information and Communication Engineers (IEICE); Dec. 12, 1996.

\* cited by examiner

*Primary Examiner*—Leslie Pascal
*Assistant Examiner*—Hanh Phan
(74) *Attorney, Agent, or Firm*—Katten Muchin Zavis Rosenman

(57) ABSTRACT

A protection switch comprising a demultiplexer, optical selector, a multiplexer, and a monitor circuit is provided on the input side and the output side of an optical XC node. The demultiplexer demultiplexes the wavelength-multiplexed optical signals of a 0-system and a 1-system, and transmits these optical signals to the optical selectors which are provided for the respective wavelengths. The optical selectors are controlled by the monitor circuit, and switch the optical signal of one system to that of the other system when a fault occurs. The optical signals of the respective wavelengths outputted from the optical selectors are multiplexed by a multiplexer to be transmitted. The demultiplexer and the multiplexer can be differently arranged depending on the configuration of a transmission line or the optical XC node. Further, a multi-wavelength selection filter such as an acousto-optical filter or the like can be used as a protection switch.

23 Claims, 28 Drawing Sheets

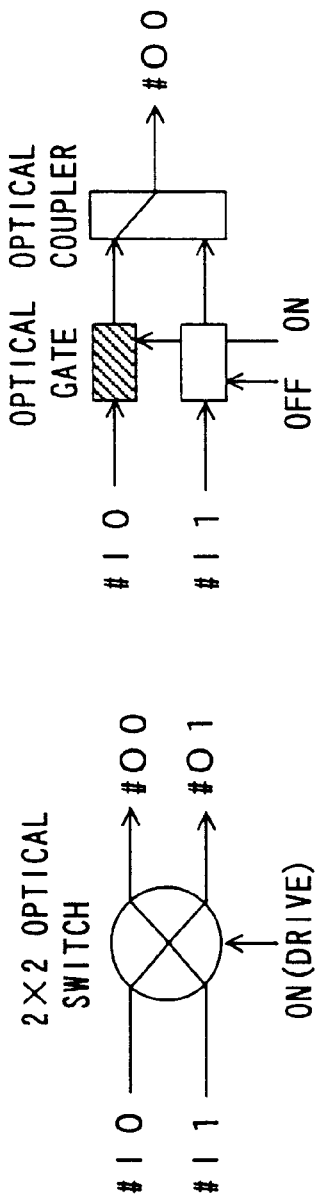
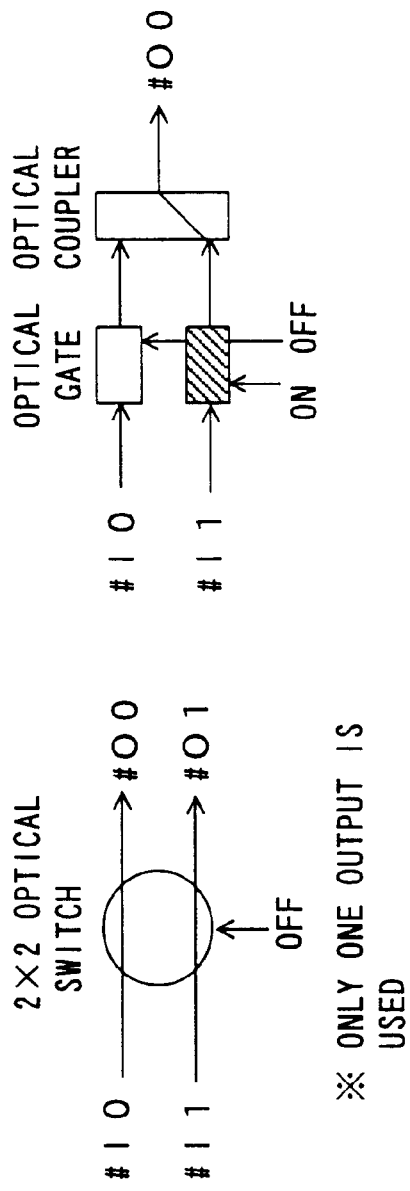
FIG. 2A
2×2 OPTICAL SWITCH TYPE
FIG. 2B
OPTICAL GATE TYPE

TYPE A (NODE IS DUPLEXED)

TYPE B (TRANSMISSION LINE IS DUPLEXED)

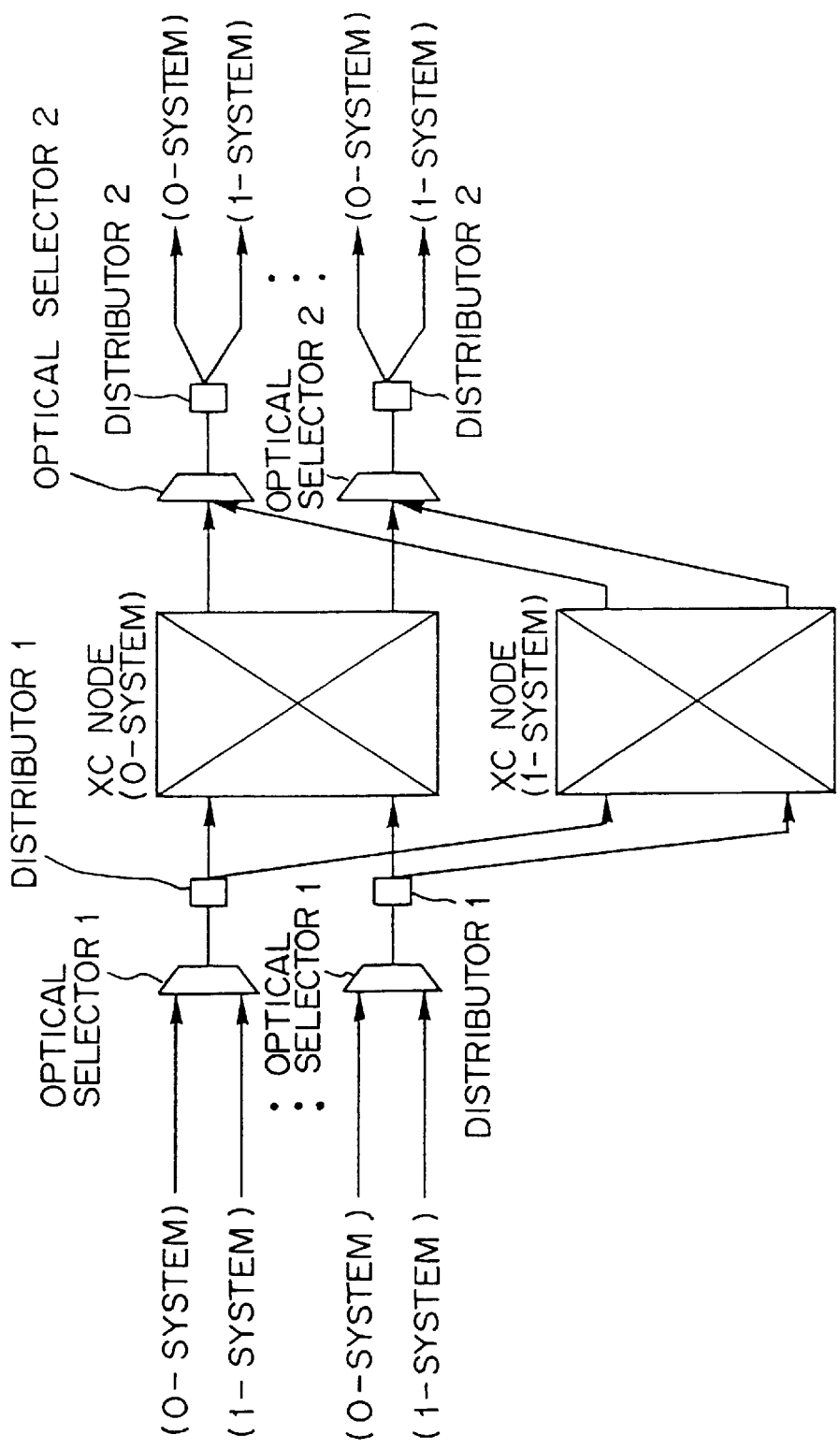
FIG. 7A  TYPE C (TRANSMISSION LINE IS DUPLEXED, AND NODE IS DUPLEXED)

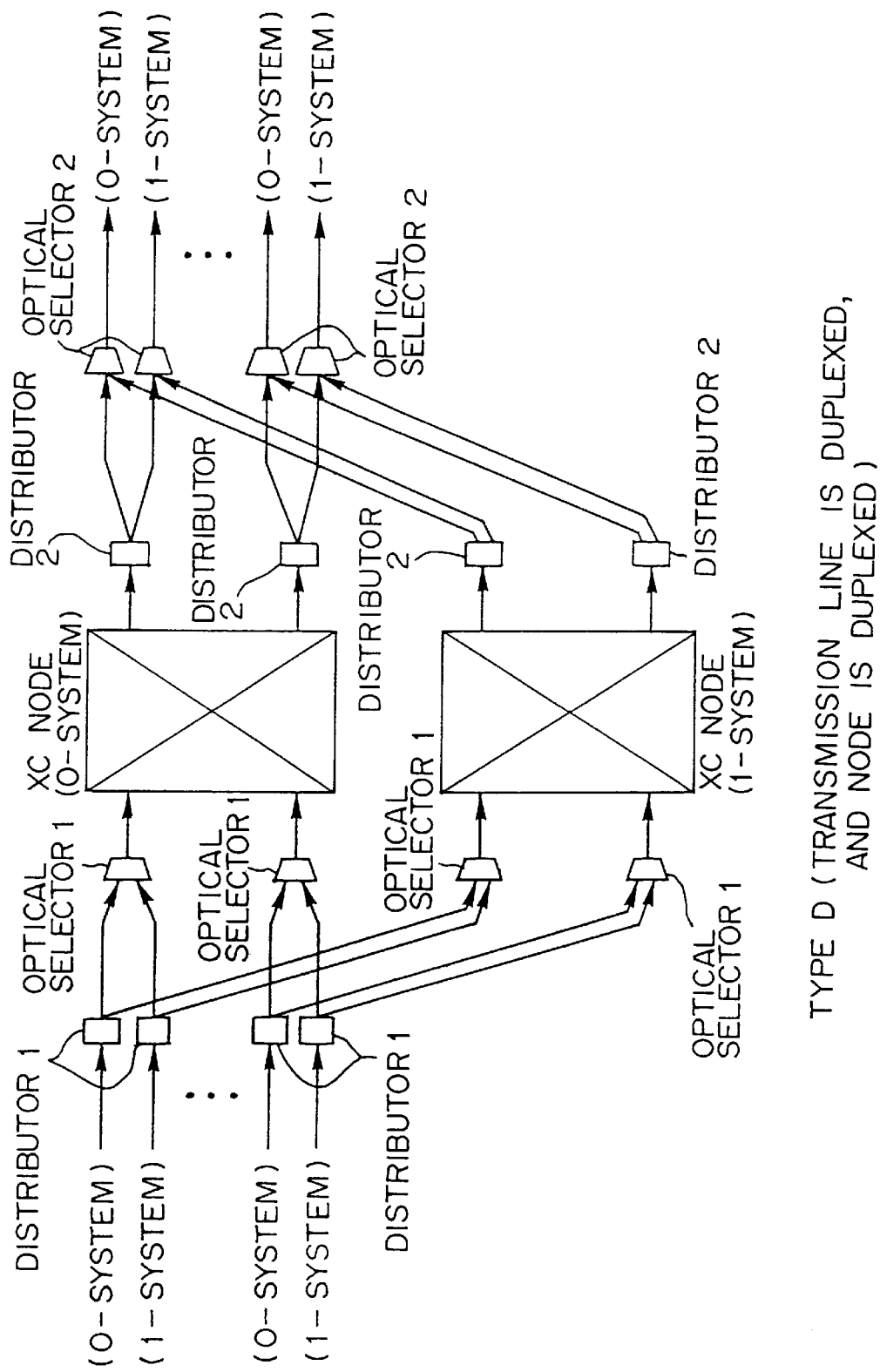
FIG. 7B  TYPE D (TRANSMISSION LINE IS DUPLEXED, AND NODE IS DUPLEXED)

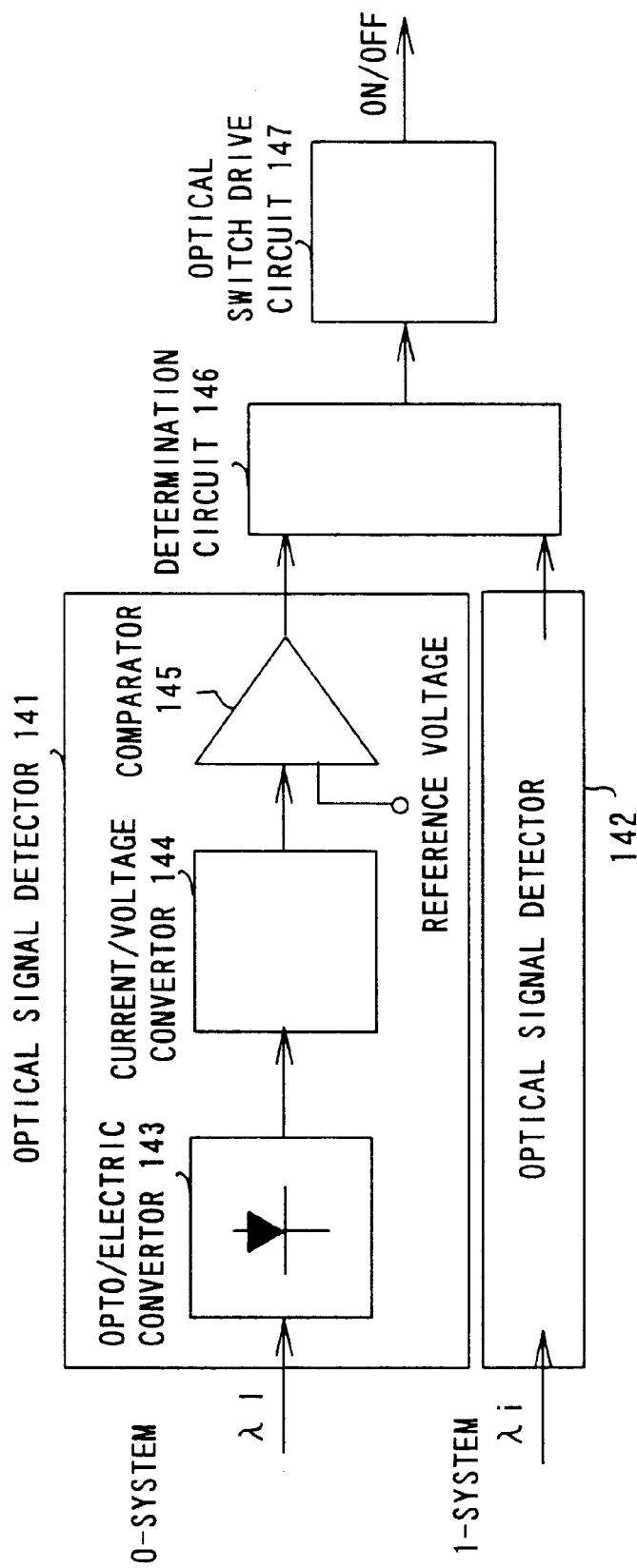
F I G. 16

OPTICAL WAVELENGTH MULTIPLEXING SYSTEM HAVING A REDUNDANT CONFIGURATION

BACKGROUND OF THE INVENTION

1. Field of the Invention

The present invention relates to a redundant structure in an optical wavelength multiplexing system.

2. Description of the Related Art

With the increase in the processing speed and the capacity of information, the need for broadening the band of/increasing the capacity of a network and a transmission system has been required. Therefore, as one of the means of realizing this, the configuration of an optical network based on a wavelength division multiplexing technology has been desired. When configuring an optical network, a key point is an optical path cross connection system in an optical wavelength multiplexing system (a device for routing optical signals inputted from a plurality of optical fibers, whose wavelengths have been multiplexed, to desired output optical fibers for each wavelength).

On the other hand, with the increase in a transmission capacity, faults which occur in the transmission line and a node have a great influence. Therefore, it is necessary to provide a redundant configuration in the transmission line and the node in order to increase the reliability at the time of faults.

FIGS. 1A and 1B show examples of a redundant configuration in a conventional optical wavelength multiplexing system.

FIG. 1A shows an example of a redundant configuration of a node output portion in the conventional optical wavelength multiplexing system (for example, optical path cross connection system; optical XC system).

A node is duplexed (0-system/1-system), and is provided with optical selectors 2700 and 2701 at the output. Monitor circuits 2702 and 2703 detect whether output optical signals are normal or abnormal for all the wavelengths outputted from each node, and control the switching of protection switches (optical selectors 2700 and 2701).

In FIG. 1A, a set of an optical XC node, a protection switch, and monitor circuits 2702 and 2703 is provided. Actually, however, the same number of optical selectors and the same number of monitor circuits are provided as that of a 0-system line 2704 and a 1-system line 2705, outputted from the optical XC nodes.

The monitor circuits 2702 and 2703 input both the 0-system line 2704 and the 1-system line 2705, which correspond to the optical XC node (0) and the optical XC node (1), respectively. Then, the circuits receive optical signals, and monitor whether or not faults occur on the lines. When the 0-system line is being used, if the monitor circuit 2702 or 2703 detects the occurrence of a fault in this 0-system line, the optical selector 2700 or the optical selector 2701 is controlled to switch to the 1-system line.

FIG. 1B shows an example of a redundant configuration in an input transmission line to a node in a conventional optical XC system.

The transmission line is duplexed (0-system/1-system), and a protection switch 2708 is provided at the preceding stage of the optical XC system. The protection switch 2708 is composed of optical selectors 2709 and 2710, and monitor circuits 2706 and 2707 corresponding to these optical selectors. The optical transmission line which has redundancy to provide a 0-system and a 1-system is configured by a set of a 0-system transmission line and a 1-system transmission line, and this set of transmission lines is connected to the optical selector 2709 or 2710. The monitor circuits 2706 and 2707 detect whether the input optical signals from each transmission line are normal or abnormal for all the wavelengths. When a fault is detected in the optical signals, the protection switch 2708 is controlled to be switched. In the case of FIG. 1B, the optical XC node is not provided with a redundant configuration, but this node can further be provided with a 0-system node and a 1-system node as shown in FIG. 1A. In this case, the optical selectors 2709 and 2710 should be provided with two inputs and two outputs.

FIGS. 2A and 2B show examples of the configuration of a conventional protection switch (optical selector). FIG. 2A shows the case where an optical selector is configured by 2×2 optical switches. When a transmission line to be inputted to the optical selector has redundancy to provide a 0-system and a 1-system as shown in FIG. 1A or 1B, only one output is used.

FIG. 2B shows a configuration where gate-type optical switches and an optical coupler are combined.

These switches are basically the same as a conventionally known optical switch, but they make use of a function of switching the optical path of the inputted optical signal. That is, these optical switches are configured in such a way that the optical signal whose optical path has been switched is prevented from being externally outputted by using a photo absorption material or the like, which is provided along the optical path. The optical switches having such a configuration are used as optical gates. An optical coupler can be a conventionally-known optical coupler, and only transmit the optical signal outputted from the optical gate to the transmission line.

As an example of such an optical switch, an optical switch which is composed of an inductive material such as $LiNbO_3$ or a semiconductor such as InP, GaAs or the like, can be adopted. This switch performs ON/OFF control by being applied by a voltage or a current. As one example of the details of such an optical switch, please refer to the document "IEEE JOURNAL ON SELECTED AREAS IN COMMUNICATIONS, VOL. 6, NO. 7, pp. 1267–1272 (1988)" or the like.

According to the conventional configuration, one wavelength transmission system is used. Accordingly, when a monitor circuit detects a fault only in one wavelength of an optical signal having a plurality of wavelengths which have been multiplexed, even the remaining normal optical signals are simultaneously switched to the other system by a protection switch.

In the case of one wavelength transmission, since the optical signal to be transmitted has one wavelength, that is, one channel, no problem will arise. In an optical wavelength multiplexing system, however, since an optical signal of a plurality of wavelengths is transmitted to one transmission line, even optical signals in which faults do not occur are also switched.

Therefore, in an originally normal optical signal, a signal disconnection is generated at the time of the switching so that the transmission efficiency will deteriorate. Even if an optical switch which performs processings at high speed up to a level where any error will not occur in directing a signal, a circuit is required for matching a phase of an optical signal of the 0-system with that of the 1-system before the protection switch. The same number of these circuits is required as that of the wavelengths so that the amount of hardware will increase. Further, it is more difficult to perform the switching and the phase matching for a high speed optical switch, as the transmission speed increases.

In spite of the above-mentioned problems, however, no specific configuration other than a configuration of one wavelength transmission is proposed at present, for the redundant configuration of an optical wavelength multiplexing system.

SUMMARY OF THE INVENTION

The present invention provides an optical wavelength multiplexing system having a redundant configuration only for switching the optical signal of a wavelength in which a fault occurs, among optical signals whose wavelengths have been multiplexed.

In the optical wavelength multiplexing system according to a first aspect of the present invention, a plurality of input and output optical fibers transmitting wavelength-multiplexed optical signals are included. Further, in this optical wavelength multiplexing system for processing the optical signals for each wavelength, a protection switch is provided on an output side of a node duplexed into a first system and a second system. This protection switch comprises a demultiplexer for demultiplexing an optical signal to be inputted after its wavelengths have been multiplexed, into optical signals for each wavelength; an optical selector provided for each wavelength, for selecting optical signals outputted from either one of the duplexed nodes; and a multiplexer for coupling optical signals for each wavelength transmitted from the optical selector, is provided. When a fault is detected in an optical signal of a certain wavelength included in optical signals transmitted from either one of systems, the optical selector only switches an optical signal of the wavelength in which the fault is detected, into the other system.

An optical wavelength multiplexing system according to a second aspect of the present invention, includes a plurality of input and output optical fibers transmitting wavelength-multiplexed optical signals. In this optical wavelength multiplexing system for processing optical signals in units of wavelengths, a protection switch is provided on an output side of a node which is duplexed into a first system and a second system. This protection switch comprises an optical selector provided for each wavelength, for selecting optical signals outputted from either one of the duplexed nodes, and a multiplexer for coupling optical signals for each wavelength transmitted from the optical selector. When a fault is detected in an optical signal of a certain wavelength included in optical signals transmitted from either one of the systems, the optical selector only switches an optical signal of the wavelength in which the fault is detected, into the other system.

An optical wavelength multiplexing system according to a third aspect of the present invention, includes a plurality of input and output optical fibers transmitting wavelength-multiplexed optical signals. In this optical wavelength multiplexing system for processing optical signals in units of wavelengths, a protection switch is provided on a transmission line which is duplexed into a first system and a second system. This protection switch comprises a multiplexer for multiplexing optical signals to be inputted after their wavelengths have been multiplexed, into optical signals for each wavelength; an optical selector provided for each wavelength, for selecting optical signals outputted from either one of the duplexed nodes, and a multiplexer for coupling optical signals for each wavelength transmitted from the optical selector. When a fault is detected in an optical signal of a certain wavelength included in optical signals transmitted from either one of systems, the optical selector only switches an optical signal of the wavelength in which the fault is detected, into the other system.

An optical wavelength multiplexing system according to a fourth aspect of the present invention, includes a plurality of input and output optical fibers transmitting wavelength-multiplexed optical signals. In this optical wavelength multiplexing system for processing optical signals in units of wavelengths, a protection switch is provided on a transmission line which is duplexed into a first system and a second system. This protection switch comprises an optical selector provided for each wavelength, for selecting optical signals outputted from either one of the duplexed nodes, and a multiplexer for coupling optical signals for each wavelength transmitted from the optical selector. When a fault is detected in an optical signal of a certain wavelength included in optical signals transmitted from either one of systems, the optical selector only switches an optical signal of the wavelength in which the fault is detected, into the other system.

An optical wavelength multiplexing system according to a fifth aspect of the present invention, includes a plurality of input and output optical fibers transmitting wavelength-multiplexed optical signals. In this optical wavelength multiplexing system for processing optical signals in units of wavelengths, a filter for selecting an optical signal of a plurality of optional wavelengths is provided at a protection switch for switching the systems of the outputs of a node which has been duplexed into the first system and the second system. When a fault is detected in an optical signal of a certain wavelength included in optical signals transmitted from either one of systems, the optical selector only switches an optical signal of the wavelength in which the fault is detected, into the other system.

An optical wavelength multiplexing system according to a sixth aspect of the present invention, includes a plurality of input and output optical fibers transmitting wavelength-multiplexed optical signals. In this optical wavelength multiplexing system for processing optical signals in units of wavelengths, a filter for selecting a plurality of optional optical signals is provided at a protection switch for switching the systems of the output of a node which has been duplexed into the first system and the second system. When a fault is detected in an optical signal of a certain wavelength included in optical signals transmitted from either one of the systems, the optical selector only switches an optical signal of the wavelength in which the fault is detected, into the other system.

An optical wavelength multiplexing system according to a seventh aspect of the present invention, comprises a transmission line for propagating an optical signal, and a node connected to the transmission line, for propagating the optical signal. In this optical wavelength multiplexing system which has redundancy by providing transmission lines or nodes in plural, a monitor means and a switch means are provided. The monitor means monitors a wavelength-multiplexed optical signal to be transmitted, for each wavelength. The switch means only switches an optical signal of a wavelength in which a fault occurs, to an optical signal transmitted from the other corresponding transmission line or node, among optical signals transmitted from the plurality of the transmission lines or nodes.

When a fault is detected in an optical signal of a certain wavelength among optical signals whose wavelengths have been multiplexed to be transmitted, the present invention only switches the system of the optical signal of a wavelength in which a fault occurs, but does not switch all the optical signals whose wavelengths have been multiplexed, to any one of the systems provided in plural. Therefore, the present invention does not switch the system of optical signal in which a fault does not occur, so that a transmission deterioration such as a signal disconnection caused by the switching of the system of a normal optical signal will not be generated.

BRIEF DESCRIPTION OF THE DRAWINGS

FIGS. 2A and 2B are block diagrams showing examples of the configuration of a conventional protection switch (optical selector);

FIGS. 7A and 7B are block diagrams (No. 2) showing redundant configurations of a node and a transmission line in an XC system (without multiplexing wavelengths) which is generally adopted;

FIG. 16 is a block diagram showing a configuration example of a monitor circuit in the case where a 2×2 switch is used as an optical selector;

DESCRIPTION OF THE PREFERRED EMBODIMENTS

Figure 1A:
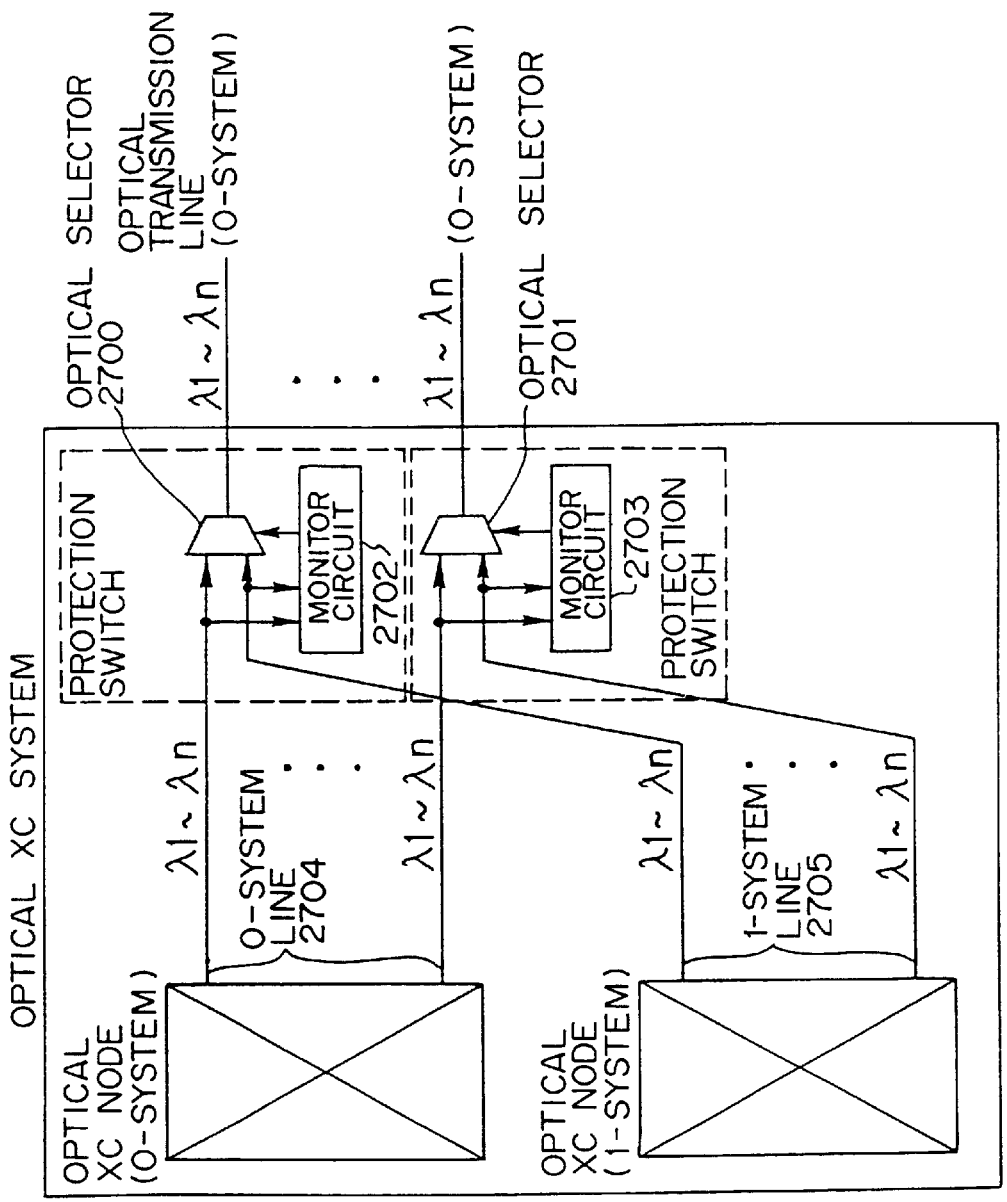
FIGS. 1A and 1B are block diagrams showing examples of the redundant configuration of a conventional optical wavelength multiplexing system.
Figure 1B:
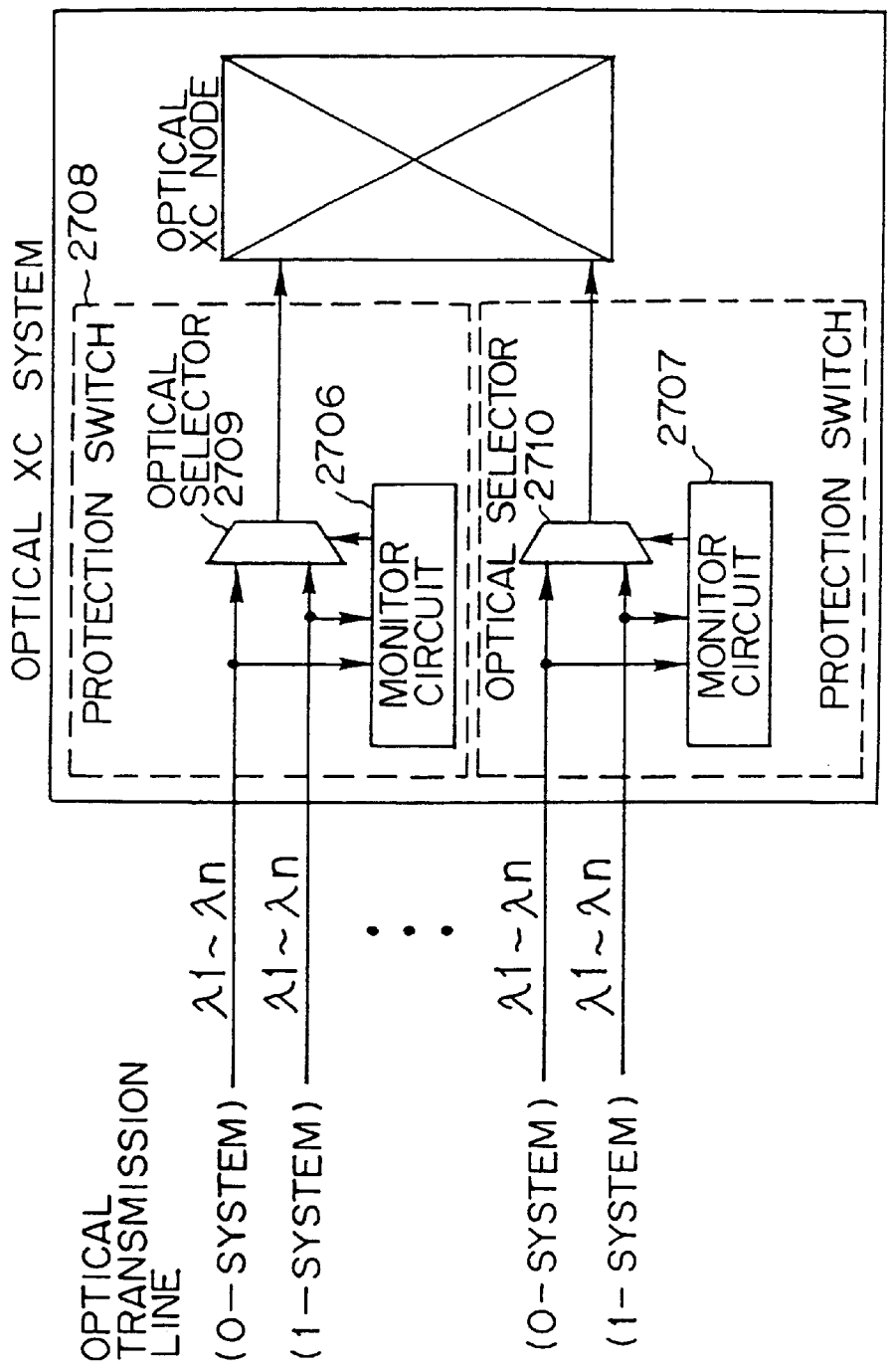
Figure 3:
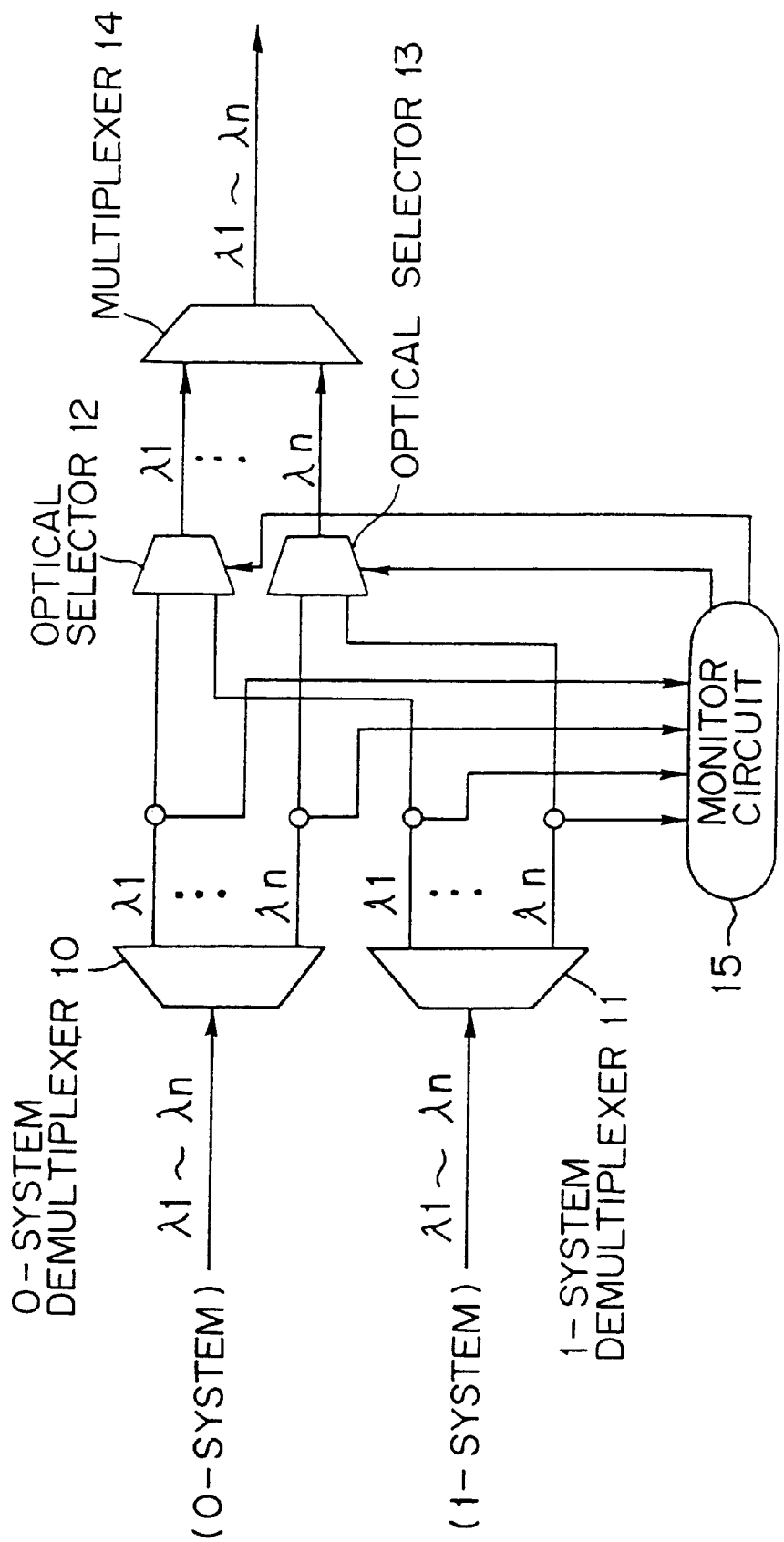
FIG. 3 is a block diagram showing a basic configuration of the protection switch according to one embodiment of the present invention.

FIG. 3 shows a basic configuration of a protection switch according to one embodiment of the present invention.

As shown in FIG. 3, the protection switch comprises an optical demultiplexer which corresponds to each system, an optical selector which corresponds to each wavelength, and an optical multiplexer. A monitor circuit monitors the optical signals of all the wavelengths and controls the optical selector.

That is, a 0-system demultiplexer 10 and a 1-system demultiplexer 11 which input a 0-system wavelength-multiplexed optical signal and a 1-system wavelength-multiplexed optical signal, respectively, are provided corresponding to the respective systems. The 0-system demultiplexer 10 and the 1-system demultiplexer 11 demultiplex the transmitted wavelength-multiplexed optical signal of-wavelengths $\lambda1$ to $\lambda n$, and whose wavelengths have been multiplexed to be inputted, into individual wavelengths. These demultiplexers can be any demultiplexers if they are suitable for constructing a system, such as a conventionally known fiber grating type demultiplexer.

A monitor circuit 15 receives the 0-system and 1-system optical signals of wavelengths from $\lambda1$ to $\lambda n$, which are outputted from the 0-system demultiplexer and the 1-system demultiplexer 11, and monitors whether or not a fault occurs in any one of the optical signals. In FIG. 3, a configuration corresponding to the wavelengths from $\lambda1$ to $\lambda n$ only is shown, but actually this monitor circuit monitors all the 0-system and the 1-system optical signals of wavelengths from λ1 to λn. The optical signals outputted from the 0-system demultiplexer 10 and the 1-system demultiplexer 11 for each wavelength are inputted to optical selectors 12 and 13 provided for each wavelength (in FIG. 3, a configuration corresponding to wavelengths λ1 and λn is only shown). The selector 12 switches between 0-system optical signal of wavelength λ1 and the 1-system optical signal of wavelength Al. The selector 13 switches between the 0-system optical signal of wavelength An and the 1-system optical signal of wavelength λn. In addition to these optical selectors, optical selectors which are not shown in this figure, each for switching between the 0-system optical signal of another wavelength and the 1-system optical signal of this same wavelength, are provided.

The optical selectors 12 and 13 are individually controlled by the monitor circuit 15, and switch between the 0-system optical signal and the 1-system optical signal, for each wavelength. The optical signals of respective wavelengths outputted from the optical selectors 12 and 13 are inputted to a multiplexer 14, and the thus-inputted optical signals are multiplexed to be outputted to a transmission line.

Thus, the protection switch demultiplexes the wavelength-multiplexed optical signal into respective wavelengths, switches between a 0-system optical signal and a 1-system optical signal, and multiplexes the thus-switched optical signals. Accordingly, the protection switch only switches the optical signal of a wavelength in which a fault occurs. Therefore, a signal disconnection which is caused by a protection switch, is not generated in the optical signals of the other wavelengths in which a fault does not occur, so that only a system of the optical signal of a wavelength in which a fault occurs is switched thereby maintaining a transmission quality.

Figure 4:
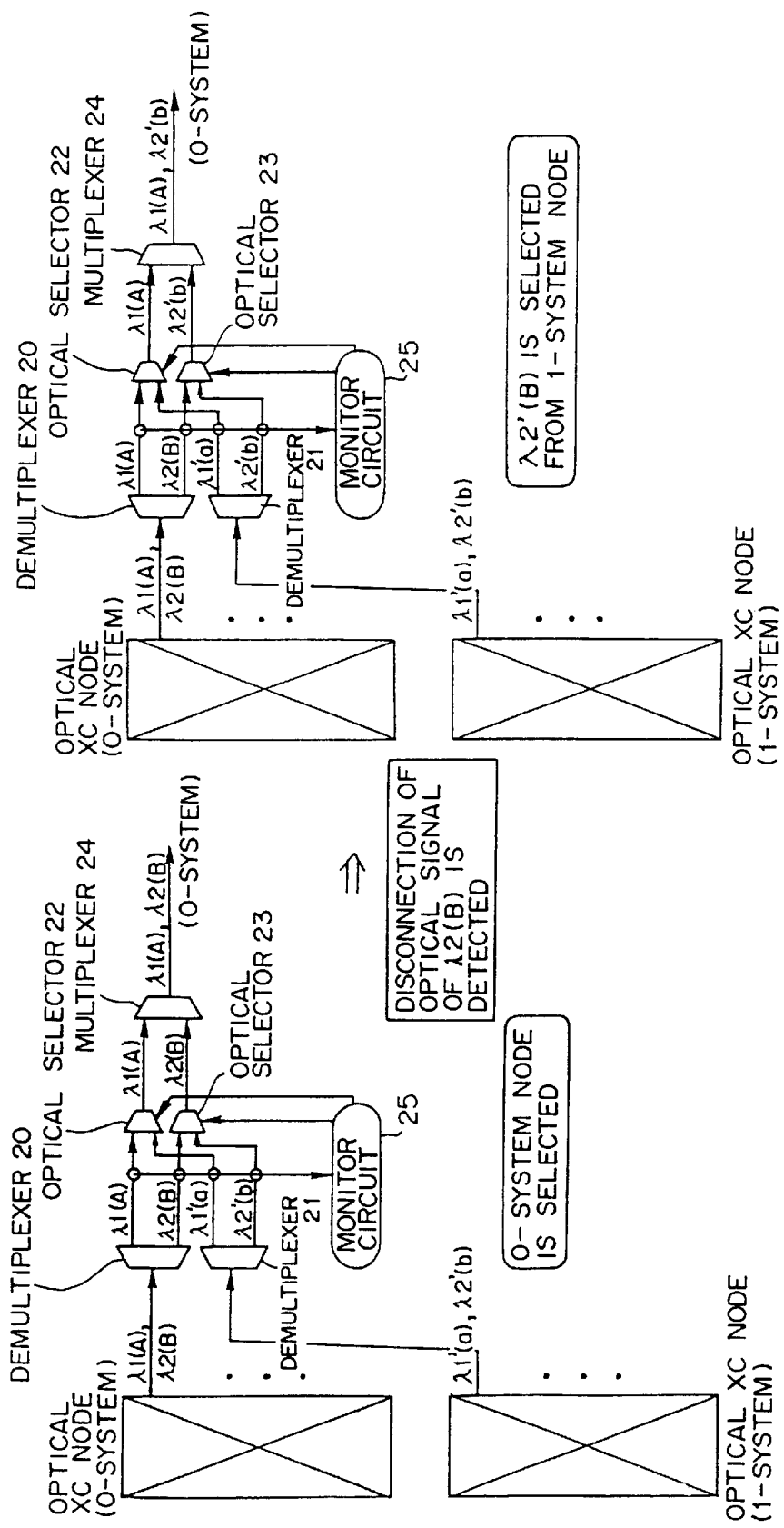
FIG. 4 is a block diagram showing protection switch operations performed at a node output portion according to one embodiment of the present invention.

FIG. 4 is a block diagram explaining protection switch operations at a node output portion according to one embodiment of the present invention.

According to the configuration shown in this figure, the optical XC node has redundancy to provide a 0-system and a 1-system, and switching between the optical signal outputted from the 0-system optical XC node and the optical signal outputted from the 1-system optical XC node is performed by a protection switch which comprises demultiplexers 20 and 21, optical selectors 22 and 23, and a multiplexer 24. Here, optical signals of wavelengths from λ1 to λ2 are multiplexed. The optical signal outputted from the 0-system optical XC node is inputted to the demultiplexer 20 to be split into an optical signal of wavelength λ1 and that of wavelength λ2. Similarly, the optical signal outputted from a 1-system optical XC node is an optical signal whose wavelengths from λ1' to λ2' are multiplexed. A demultiplexer 21 splits this optical signal into an optical signal of a wavelength λ1' and that of λ2'. Here, λ1 and λ1' are the same wavelengths and carry the same optical signals while λ2 and λ2' are the same wavelengths and carry the same optical signals.

A monitor circuit 25 monitors 0-system and 1-system optical signals for each wavelength, on the output side of the demultiplexers 20 and 21. This circuit controls optical selectors 22 and 23 when a fault occurs, and switches the selectors to transmit normal optical signals to a multiplexer 24.

For example, assume that a fault is detected in the optical signal of a wavelength λ2, which has been outputted from the 0-system optical XC node. In this case, the selector 23 provided on the λ2 side is controlled to switch from the 0-system optical signal of the wavelength λ2 to the 1-system optical signal of the wavelength λ2 (switched to the optical signal of wavelength λ2', in FIG. 4). Therefore, the optical signal outputted from a multiplexer 24 is one obtained by coupling the optical signal of the wavelength λ1 and that of the wavelength λ2. However, after a fault is detected in the optical signal of the wavelength λ2, the optical signal outputted from the multiplexer 24 is one obtained by coupling the optical signal of the wavelength λ1 and that of the wavelength λ2', as shown in the right of FIG. 4.

Thus, since only the optical signal in which a fault occurs is changed, it is not necessary to change the optical signal of a wavelength λ1 in which a fault does not occur, and accordingly a signal disconnection will not occur.

Figure 5:
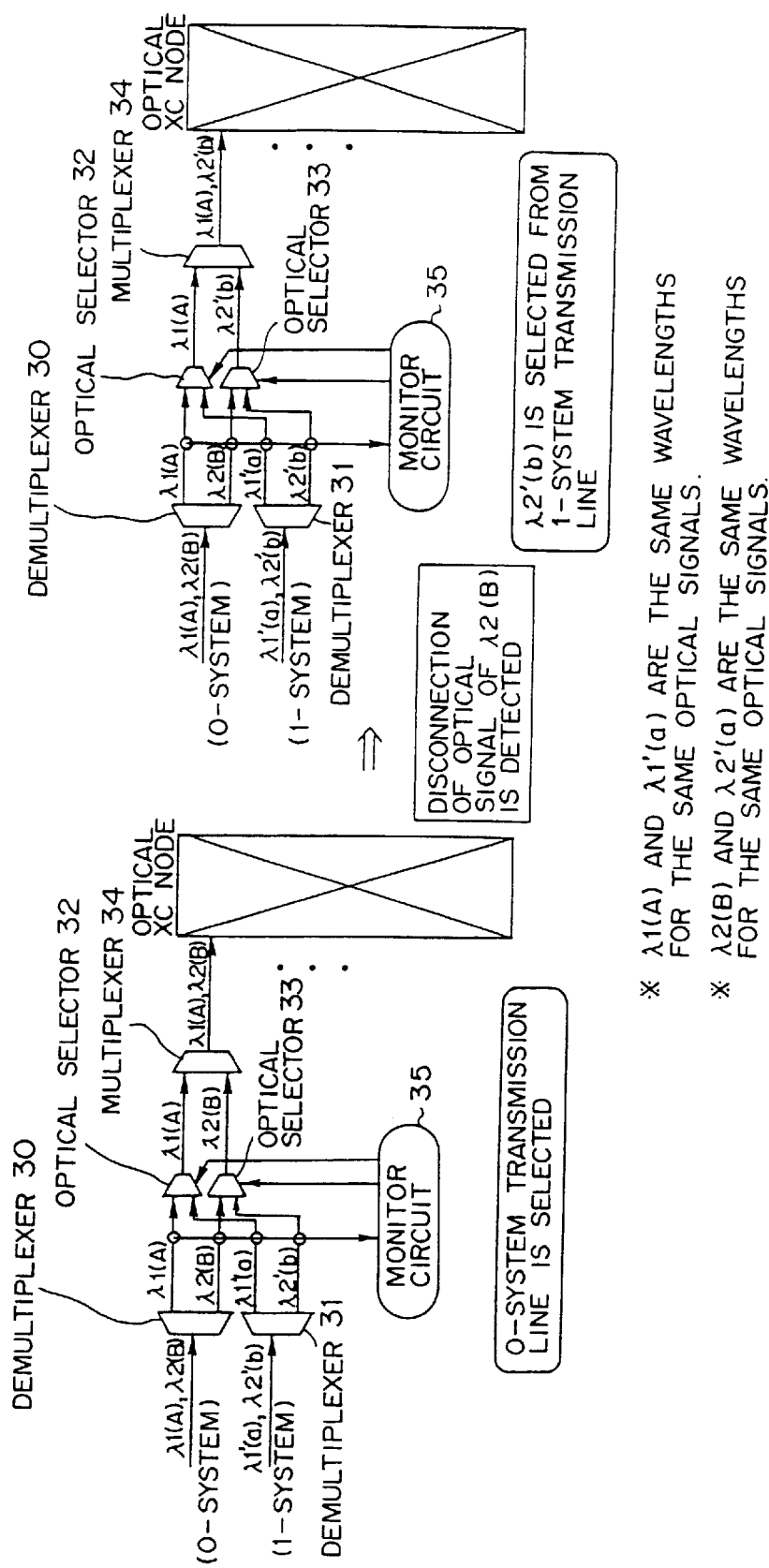
FIG. 5 is a block diagram showing protection switch configuration and operations performed at an input transmission line to a node according to one embodiment of the present invention.

FIG. 5 is a block diagram explaining protection switch configuration and operations at an input transmission line to a node, according to one embodiment of the present invention.

In FIG. 5, a transmission line has redundancy to provide a 0-system and a 1-system, and respective optical signals are inputted to a demultiplexer 30 corresponding to the 0-system and a demultiplexer 31 corresponding to the 1-system. As mentioned above, these demultiplexers 30 and 31 split the wavelength-multiplexed optical signal into optical signals of the respective wavelengths to be inputted to the optical selectors 32 and 33. Here, the number of wavelengths to be multiplexed is 2, and the optical signal of a wavelength λ1 (=λ1') and the optical signal of a wavelength λ2 (=λ2') are generated. However, the number of wavelengths to be multiplexed is not restricted to 2, and the same number of optical selectors is provided as that of optical signals of wavelengths to be multiplexed. Optical signals which propagate through the 0-system and the 1-system transmission lines are the same.

The monitor circuit 35 monitors the outputs from the demultiplexers 30 and 31, and controls the switching of optical selectors 32 and 33 provided for each system. In FIG. 5, assume that a fault is detected in the 0-system optical signal of a wavelength λ2. In this case, the monitor circuit 35 controls the optical selector 33 on the λ2 side, and switches the optical signal of the wavelength λ2 from the 0-system to 1-system (switches from the optical signal of λ2 to an optical signal of λ2'). Therefore, only the optical signal in which a fault occurs is switched to be transmitted to an optical XC node. As shown in the right of FIG. 5, the optical signal of a wavelength λ1 and that of a wavelength λ2' are transmitted to the optical XC node.

FIGS. 6A to 7B are block diagrams showing the redundant configurations of a node and a transmission line in an XC system (without multiplexing a wavelength) which is generally adopted.

Figure 6A:
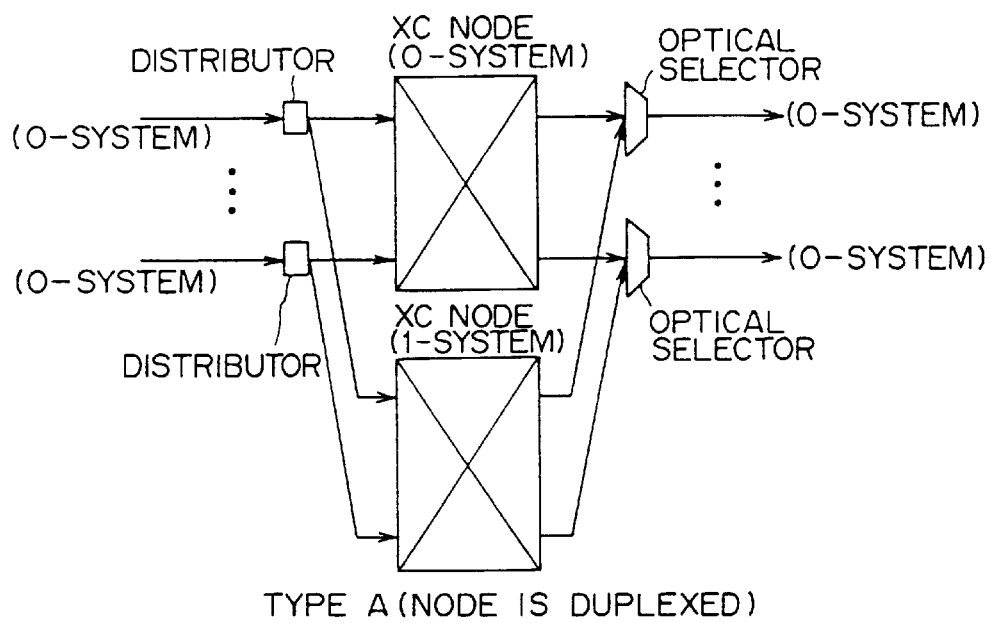
FIGS. 6A and 6B are block diagrams (No. 1) showing redundant configurations of a node and a transmission line in an XC system (without multiplexing wavelengths) which is generally adopted.

In FIG. 6A, only the node is duplexed, and the systems are switched by the selector when a fault occurs on the node. That is, the signal which is inputted to a distributor is split by this distributor, and the same signals are inputted to a 0-system XC node and a 1-system XC node. The signals which are outputted from the 0-system XC node and the 1-system XC node are the same and are inputted to the same selector. A monitor circuit which is not shown in FIG. 6A is provided at the selector, and monitors optical signals outputted from the 0-system XC node and the 1-system XC node. Generally, the signal inputted from the 0-system XC node is outputted from the selector, but when it is determined that a fault occurs on the optical signal outputted from the 0-system XC node, the selector is switched to output an optical signal from the 1-system XC node.

Thus, even if a fault or the like occurs on the 0-system XC node, and accordingly an optical signal to be outputted has a fault, a normal optical signal can be transmitted by outputting an optical signal from the 1-system XC node.

Figure 6B:
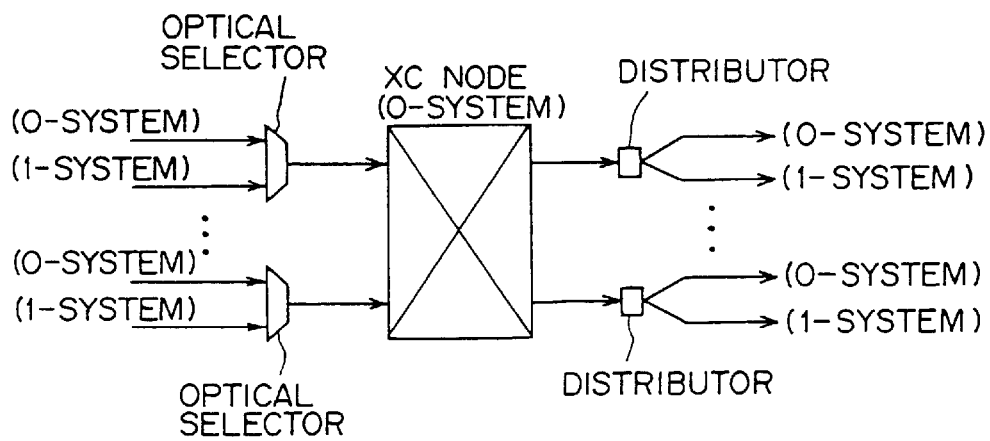

In FIG. 6B, only a transmission line is duplexed, and the systems are switched by a selector when a fault occurs on the transmission line.

In this case, the fault of the transmission line can be coped with by switching the systems. That is, the transmission line has redundancy to provide a 0-system and a 1-system, and a monitor circuit which is not shown in this figure monitors optical signals propagated from the 0-system and 1-system transmission lines. In the case where a fault is detected, the selector is controlled to switch the transmission line to a system where a fault has not occurred. Generally, a 0-system is selected. When a fault such as a disconnection of the transmission line occurs on the 0-system transmission line, the monitor system detects that optical signals are not transmitted to the 0-system, thereby switching the selector to transmit the optical signals outputted from the 1-system transmission line to the XC node. Generally, an XC node is configured to comprise a multi-input and a multi-output, and the same number of selectors is provided as that of the inputs of the XC nodes.

The signals outputted from the XC node are respectively inputted to the distributors whose number is the same as that of the outputs of the XC node. These distributors split the thus-inputted optical signal into an optical signal for the 0-system transmission line and that for a 1-system transmission line which are the same, thereby transmitting these optical signals. According to such a configuration, a fault in a signal transmission, which has occurred due to a fault in a transmission line, can be handled by the switching of the systems of the transmission lines.

In FIG. 7A, both a node and a transmission line are duplexed, and systems are switched by a selector when faults occur on the node and the transmission line.

That is, the transmission line has redundancy to provide a 0-system and a 1-system, and the XC node has redundancy to provide a 0-system and a 1-system. Optical signals which are respectively propagated from the 0-system and the 1-system are selected by a selector 1 to be transmitted to a distributor 1. The selector 1 is provided with a monitor circuit (not shown in this figure). This monitor circuit is configured to select a normal optical signal among the optical signals which propagate through the 0-system transmission line and the 1-system transmission line.

An optical signal which is selected by the selector 1 is inputted to the distributor 1. The thus-inputted signal is split into a 0-system XC node optical signal and a 1-system XC node optical signal so that the same signals are inputted to the respective XC nodes. Among the signals which are outputted from the 0-system and 1-system XC nodes, the same signals are inputted to the same selector 2. The same number of selectors 2 is provided as that of the outputs of the XC node. Among optical signals outputted from the 0-system XC node and the 1-system XC node, the selector 2 selects an optical signal in which a fault does not occur and transmits the thus-selected optical signal to the distributor 2. The distributor 2 splits the thus-received optical signal into two and transmits the same signals to the 0-system transmission line and the 1-system transmission line.

FIG. 7B is a diagram showing another example of a configuration in which both a node and a transmission line are duplexed. Since the XC node as well as the transmission line are duplexed in this configuration, the systems are switched by a selector when a fault occurs in either the XC node or the transmission line. The difference from FIG. 7A is the location of the selector and the distributor.

That is, distributors 1 are respectively provided for the redundant 0-system and 1-system of the transmission line, and these distributors split the optical signals to transmit to the redundant 0-system and 1-system of the XC node. The thus-split optical signals are the same. Among the thus-split optical signals, the 0-system optical signal and the 1-system optical signal are inputted to one selector. The same number of the selectors 1 is provided as the total number of the inputs of the 0-system and the 1-system XC nodes. An optical signal which propagates through the 0-system or the 1-system transmission line and is then selected by the selector 1 is inputted to an input of the XC node.

The selector 1 is also provided with a monitor circuit, and monitors an optical signal which propagates through the 0-system and 1-system transmission lines, thereby switching the optical signal of a system in which a fault occurs to the optical signal of another system. The corresponding optical signals which are inputted to the 0-system and 1-system XC nodes are also switched to be outputted from the outputs of the 0-system and 1-system XC nodes. The thus-outputted optical signals are inputted to distributors 2 which are respectively provided for the outputs of the 0-system and 1-system XC nodes, and generate optical signals to be transmitted to the 0- system and 1-system transmission lines. Then, a selector 2 inputs an optical signal obtained from the output of the 0-system XC node corresponding to the selector 2, and the optical signal obtained from the output of the 1-system XC node, and transmits an optical signal in which a fault has not occurred to the transmission line.

In FIG. 7A, the selector 1 and the selector 2 are provided for each input and output of the XC node. Since the selector easily breaks down compared with the distributor, an optical signal from the output of the XC node cannot be outputted to a transmission line due to the break-down of the selector 1 or the selector 2, according to the configuration shown in FIG. 7A. According to the configuration shown in FIG. 7B, by contrast, optical signals to be outputted to the 0-system and 1-system XC nodes are preliminarily generated by the distributors 1, and then the selector 1 can select an optical signal of the 0-system transmission line or that of the 1-system transmission line. Therefore, even if one of the selectors 1 breaks down, since the same optical signal is inputted to the XC node of the other system, no problem will arise by using the optical signal to be inputted to the XC node of the other system. On the output side of the XC node, similarly, the output is preliminarily split into the optical signal for a 0-system transmission line and that for a 1-system transmission line by the distributor 2, and the selector 2 selects an optical signal outputted from the 0-system transmission line or that from the 1-system transmission line. Therefore, even if one of the selectors 2 breaks down, a problem will not arise by using a signal of the other system which is split by the distributor 2. Thus, the configuration shown in FIG. 7B is more effective against the break-down of the selector than the configuration shown in FIG. 7A.

Figure 8A:
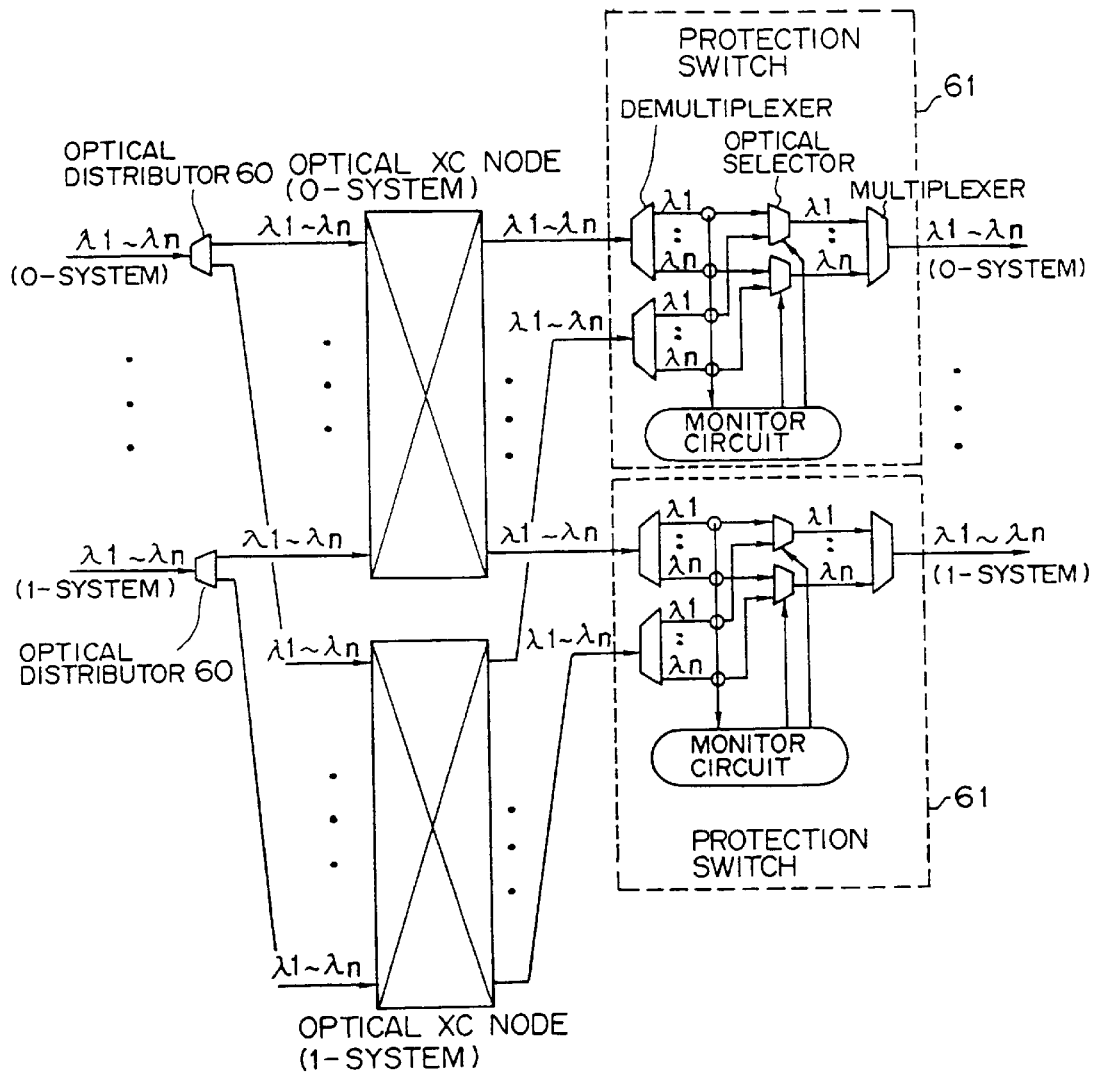
FIGS. 8A and 8B are block diagrams showing examples of a redundant configuration in the case where an optical XC node directly inputs a wavelength-multiplexed optical signal according to one embodiment of the present invention.
Figure 8B:
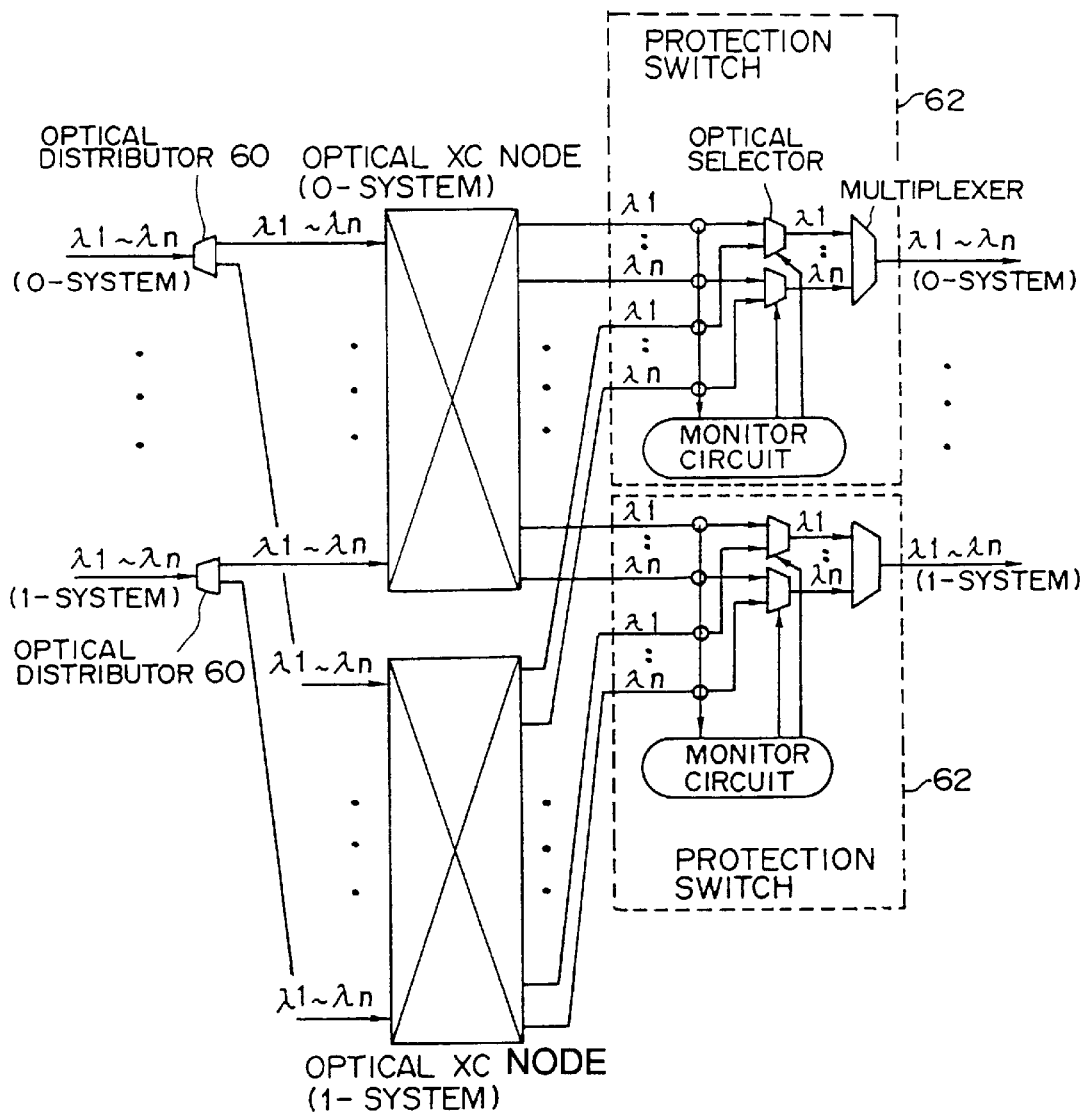

FIGS. 8A and 8B are block diagrams showing examples of redundant configurations in which an optical XC node directly inputs a wavelength-multiplexed optical signal.

FIG. 8A is a block diagram showing an example of a redundant configuration in the case where the optical XC node inputs a wavelength-multiplexed optical signal, directly routes the thus-inputted optical signal, and outputs the wavelength-multiplexed optical signal. In FIG. 8A, a plurality of transmission lines are provided, but they do not have redundancy so that they are all 0 systems. The respective transmission lines transmit optical signals each of which has a different content. The optical signal which propagates through each of the transmission lines is inputted to an optical distributor 60 provided for each transmission line. Then, the thus-inputted optical signal is split into an optical signal to be transmitted to a 0-system optical XC node (wavelengths from $\lambda 1$ to $\lambda n$ are multiplexed), and an optical signal to be transmitted to a 1-system optical XC node (the same as the optical signal to be transmitted to the 0-system optical XC node), thereby to be inputted to the 0-system and 1-system optical XC nodes, respectively. The optical XC node routes the inputted optical signal and outputs the thus-routed optical signal (since it is not always necessary to route an optical signal as being wavelength-multiplexed, it is appropriate to demultiplex the optical signal into each wavelength to be routed). The outputted optical signal is inputted to a protection switch 61 as being wavelength-multiplexed. The protection switch 61 is configured as above-mentioned, and comprises a demultiplexer for demultiplexing a wavelength-multiplexed optical signal into optical signals of the respective wavelengths, an optical selector for switching between a 0-system optical signal and a 1-system optical signal, which is provided for each wavelength, and a multiplexer for coupling optical signals of each wavelength outputted from the optical selector, and a monitor circuit for controlling the optical selector.

The same number of protection switches 61 is provided as that of the outputs of the 0-system optical XC node or the 1-system optical XC node. Since the 0-system optical XC node and the 1-system optical XC node are similarly configured, the outputs of these nodes correspond to each other. Therefore, one protection switch inputs these corresponding optical signals and switches between the 0-system and the 1-system. At this time, the protection switch 61 is configured to demultiplex a wavelength-multiplexed optical signal into each wavelength, and switches between a 0-system and a 1-system, as mentioned above. Therefore, the protection switch only switches the system of the optical signal of a wavelength in which a fault occurs, and does not switch the systems of the other optical signals. Consequently, the switching of systems can be performed without causing a signal disconnection to a normal optical signal.

FIG. 8B is a block diagram showing an example of a redundant configuration in the case where an optical XC node inputs a wavelength-multiplexed optical signal, routes the thus-inputted optical signal, and outputs optical signals of each wavelength as being multi-split. In FIG. 8B, an optical XC node is redundant, and 0-system and 1-system optical XC nodes having the same configurations are provided. Similarly to FIG. 8A, optical signals whose wavelengths from $\lambda 1$ to $\lambda n$ have been multiplexed are transmitted from a plurality of transmission lines which are not redundant, thereby to be inputted to the optical distributors 60 which are provided for the respective transmission lines. The optical distributor 60 splits the thus-inputted optical signal to be respectively transmitted to the 0-system and 1-system optical XC nodes. The 0-system and 1-system optical XC nodes route the wavelength-multiplexed optical signal (it is not always necessary to route the optical signal as being wavelength-multiplexed, and it is appropriate to split the optical signal into each wavelength to be routed), thereby outputting the thus-routed optical signal for each wavelength. The optical signal of each wavelength after routed is inputted to a protection switch 62. Since in the protection switch, the optical signal has been demultiplexed into each wavelength, a demultiplexer is not provided compared with the protection switch 61 shown in FIG. 8A. The optical signal of each wavelength is inputted to an optical selector which is provided for each wavelength, and either 0-system optical signal or 1-system optical signal is selected to be transmitted to a multiplexer. The multiplexer multiplexes optical signals of wavelengths $\lambda 1$ to $\lambda n$, and transmits the thus-multiplexed optical signal using one transmission line. A monitor circuit monitors the optical signal of each wavelength to be inputted to the protection switch 62, and controls the optical selector in the case of a fault, thereby switching this system to the other system.

Thus, when the protection switch according to the embodiment of the present invention is used, only the system of the optical signal of a wavelength in which a fault occurs can be switched so that the above mentioned effects can be obtained. The same number of protection switches 62 is provided as that of the output transmission lines (which is generally the same as the number of input transmission lines), and the protection switches receive an optical signal of wavelengths which vary from $\lambda 1$ to $\lambda n$ to be transmitted through one transmission line from the optical XC node. In FIG. 8B, one protection switch 62 is configured to input the optical signals of wavelengths $\lambda 1$ to $\lambda n$ outputted from the 0-system optical XC node and the corresponding optical signals of wavelengths $\lambda 1$ to $\lambda n$ from the 1-system optical XC node.

Figures 9A, 9B:
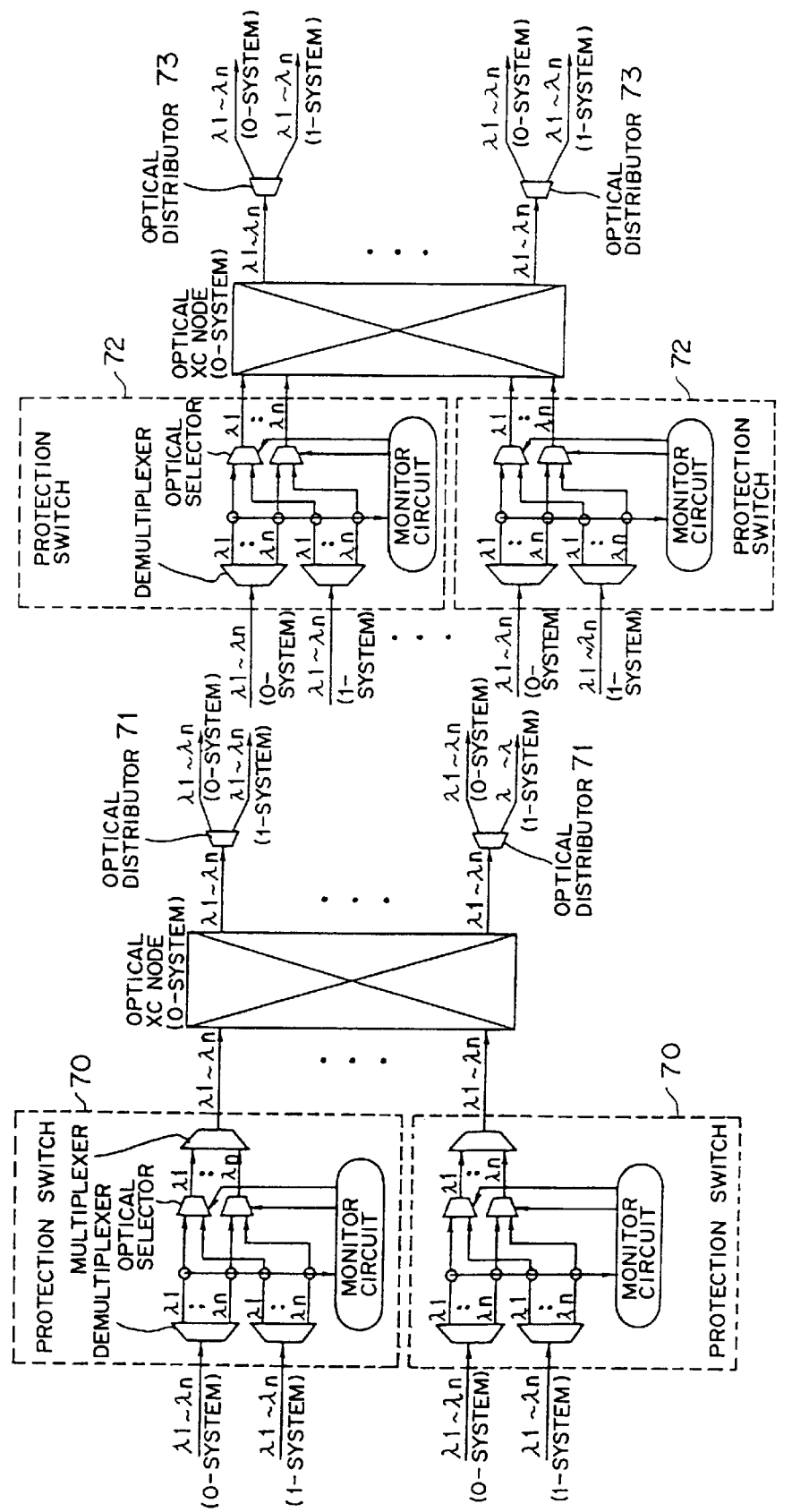
FIGS. 9A and 9B are block diagrams showing examples of a redundant configuration in the case where a transmission line is redundant.

FIGS. 9A and 9B are block diagrams showing examples of redundant configurations in the case where a transmission line is redundant.

FIG. 9A is a block diagram showing the case where an optical XC node directly inputs wavelength-multiplexed optical signals and outputs the thus-inputted wavelength-multiplexed optical signals. A protection switch 70 is configured similarly to the protection switch 61 shown in FIG. 8A. In FIG. 9A, a transmission line has redundancy to provide a 0-system and a 1-system. Although the optical signals of the same wavelengths are transmitted to upper and lower transmission lines, the contents of the optical signals are different. In the protection switch 70, the demultiplexers receive optical signals from the 0-system and 1-system transmission lines, respectively, and demultiplex the thus-received optical signals into the optical signals of the respective wavelengths to be inputted to the optical selectors which are provided for the respective wavelengths. The optical selector selects either a 0-system optical signal or a 1-system optical signal to be transmitted to a multiplexer. The optical selector is controlled by a monitor circuit, and the monitor circuit switches an optical signal in which a fault occurs to an optical signal of the other system, according to the monitor results of the optical signals of the respective wavelengths, which are received at the output portions of the demultiplexer.

The multiplexer multiplexes optical signals which have been demultiplexed into each wavelength at the protection switch 70 to be inputted to an optical XC node. When this optical signal is routed to be outputted, an optical distributor 71 splits the thus-outputted optical signal into a 0-system optical signal and a 1-system optical signal to be transmitted to a 0-system transmission line and a 1-system transmission line, respectively.

FIG. 9B is a block diagram showing an example of a redundant configuration of a transmission line in the case where an optical XC node inputs optical signals of each wavelength and outputs a wavelength-multiplexed optical signal.

A protection switch 72 shown in FIG. 9B is the same as the protection switch 70 shown in FIG. 9A without the multiplexer. The wavelength-multiplexed optical signals inputted from the 0-system transmission line and the 1-system transmission line are split into optical signals of the respective wavelengths by the demultiplexer to be inputted to the optical selectors which are provided for the respective wavelengths. A monitor circuit monitors a fault condition of the optical signal of each wavelength, controls the optical selector, and switches between the 0-system optical signal and the 1-system optical signal. The output from the optical selector is directly inputted to the optical XC node. The wavelength-multiplexed optical signal outputted from the optical XC node is inputted to an optical distributor 73, and the thus-inputted optical signal is duplexed into a 0-system optical signal and a 1-system optical signal to be transmitted to the respective transmission lines.

Figure 10:
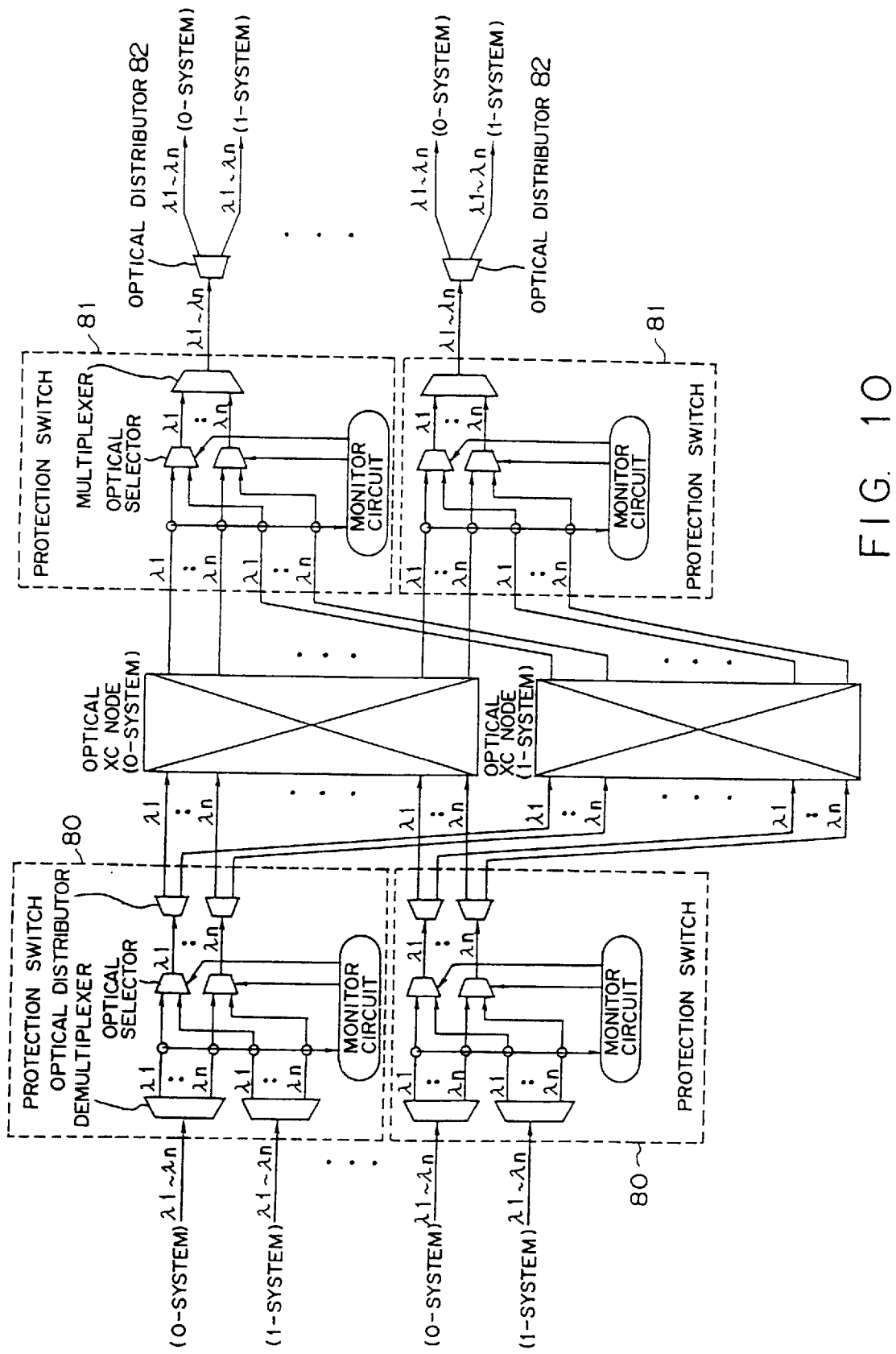
FIG. 10 is a block diagram showing an example of a redundant configuration in the case where an optical XC node inputs demultiplexed optical signals and directly outputs the thus-demultiplexed optical signals.

FIG. 10 is a block diagram showing an example of a redundant configuration in the case where an optical XC node inputs demultiplexed optical signals and outputs the optical signals as being demultiplexed.

In this figure, both a transmission line and an optical XC node have redundancy to be duplexed. The XC node is configured to input the demultiplexed optical signals and output the optical signals as being demultiplexed. In this case, a protection switch 80 inputs the wavelength-multiplexed optical signals from the 0-system and the 1-system, and the thus-inputted optical signals are demultiplexed by demultiplexers. The 0-system and the 1-system optical signals of each wavelength are inputted to one optical selector. A monitor circuit monitors all the 0-system and the 1-system optical signals and controls the optical selectors. The optical signal of each wavelength outputted from the optical selector is inputted to an optical distributor to be distributed to a 0-system optical XC node and a 1-system optical XC node.

The optical signals outputted from the 0-system and 1-system optical XC nodes are inputted to optical selectors of a protection switch 81, which are provided for the respective duplexed-wavelengths. The 0-system and 1-system optical signals to be inputted to one protection switch 81 are multiplexed later to be transmitted to a transmission line. The optical selector switches between a 0-system optical signal and a 1-system optical signal according to the instructions of a monitor circuit which monitors the optical signal of each wavelength outputted from the optical XC node, and transmits the thus-switched optical signal to a multiplexer. The multiplexer multiplexes the optical signals of each wavelength to be transmitted to an optical distributor 82. The optical distributor 82 splits the optical signal outputted from the multiplexer, and transmit the thus-split optical signals to o-system and 1-system transmission lines, in order to transmit the same signals to the thus-duplexed transmission lines.

Figure 11:
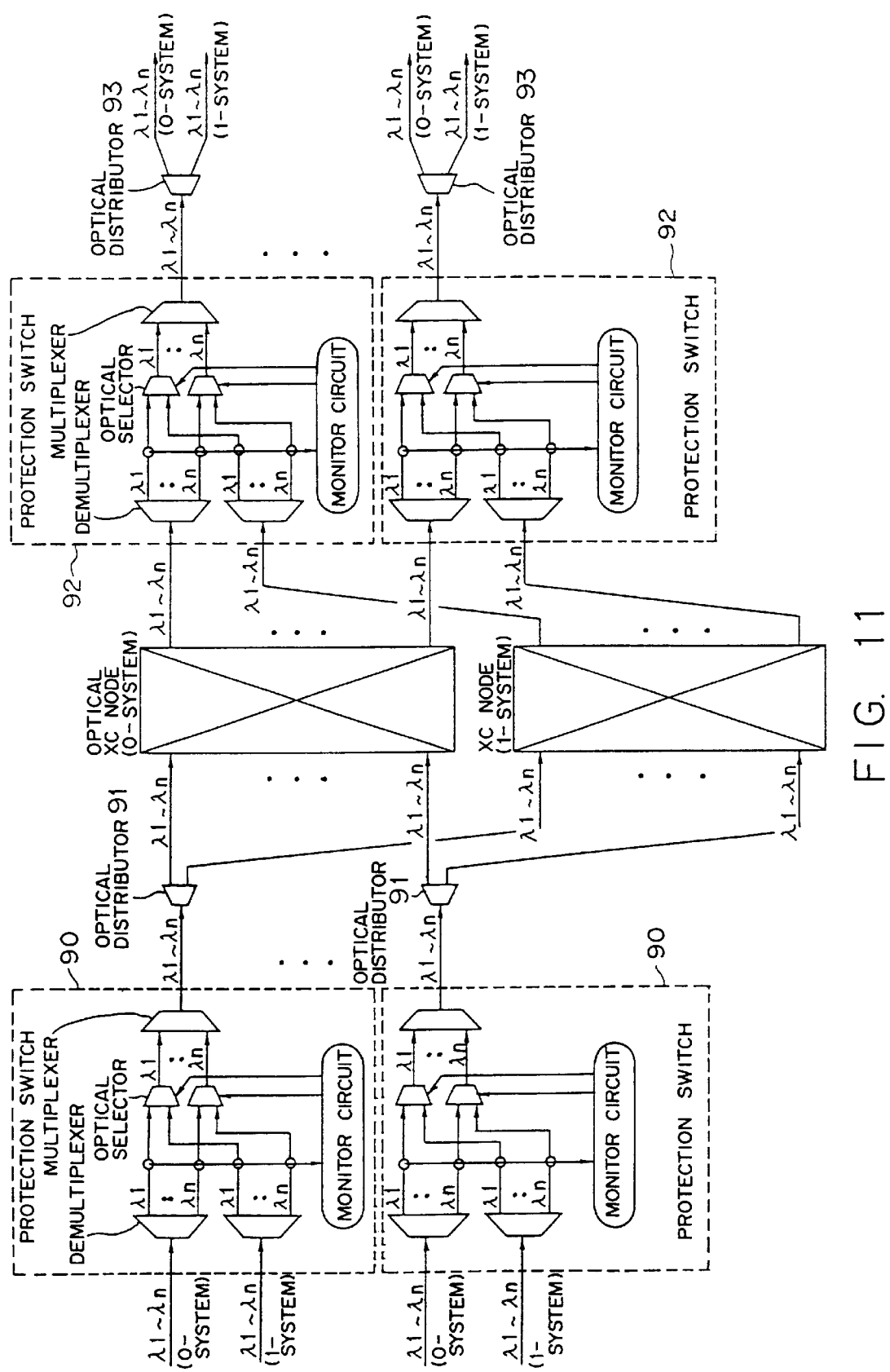
FIG. 11 is a block diagram showing another configuration example in the case where a transmission line and an optical XC node are redundant.

FIG. 11 is a block diagram showing an example of another configuration in the case where both a transmission line and an optical XC node have redundancy.

In this figure, the optical XC node inputs wavelength-multiplexed optical signals, routes the thus-inputted optical signals, and outputs the thus-routed wavelength-multiplexed optical signals. The wavelength-multiplexed optical signals inputted from the transmission lines which are duplexed into a 0-system and a 1-system are respectively inputted to the demultiplexers of a protection switch 90 to be demultiplexed into each wavelength. The optical signal of each wavelength is inputted into an optical selector, and this selector switches between the 0-system and the 1-system according to the control of a monitor circuit which monitors the outputs of the demultiplexer. The optical signal of each wavelength outputted from the optical selector is multiplexed by the multiplexer to be transmitted to an optical distributor 91. The optical distributor 91 splits the optical signal inputted from the protection switch 90 and generates the same optical signals to be distributed to the 0-system and 1-system optical XC nodes.

The optical signals which have been routed at the 0-system and 1-system optical XC nodes are transmitted to protection switches 92 to be demultiplexed into optical signals of the respective wavelengths by demultiplexers. The thus-demultiplexed optical signals of each wavelength are transmitted to an optical selector to be switched between a 0-system and a 1-system according to the control of a monitor circuit for monitoring outputs of the demultiplexer. The thus-switched optical signals are transmitted to a multiplexer. In this multiplexer, optical signals of wavelengths λ1 to λn are multiplexed to be transmitted to an optical distributor 93. This optical distributor 93 splits the optical signal outputted from the protection switch 92 and generates the same signals to be transmitted to the respective transmission lines.

Figure 12:
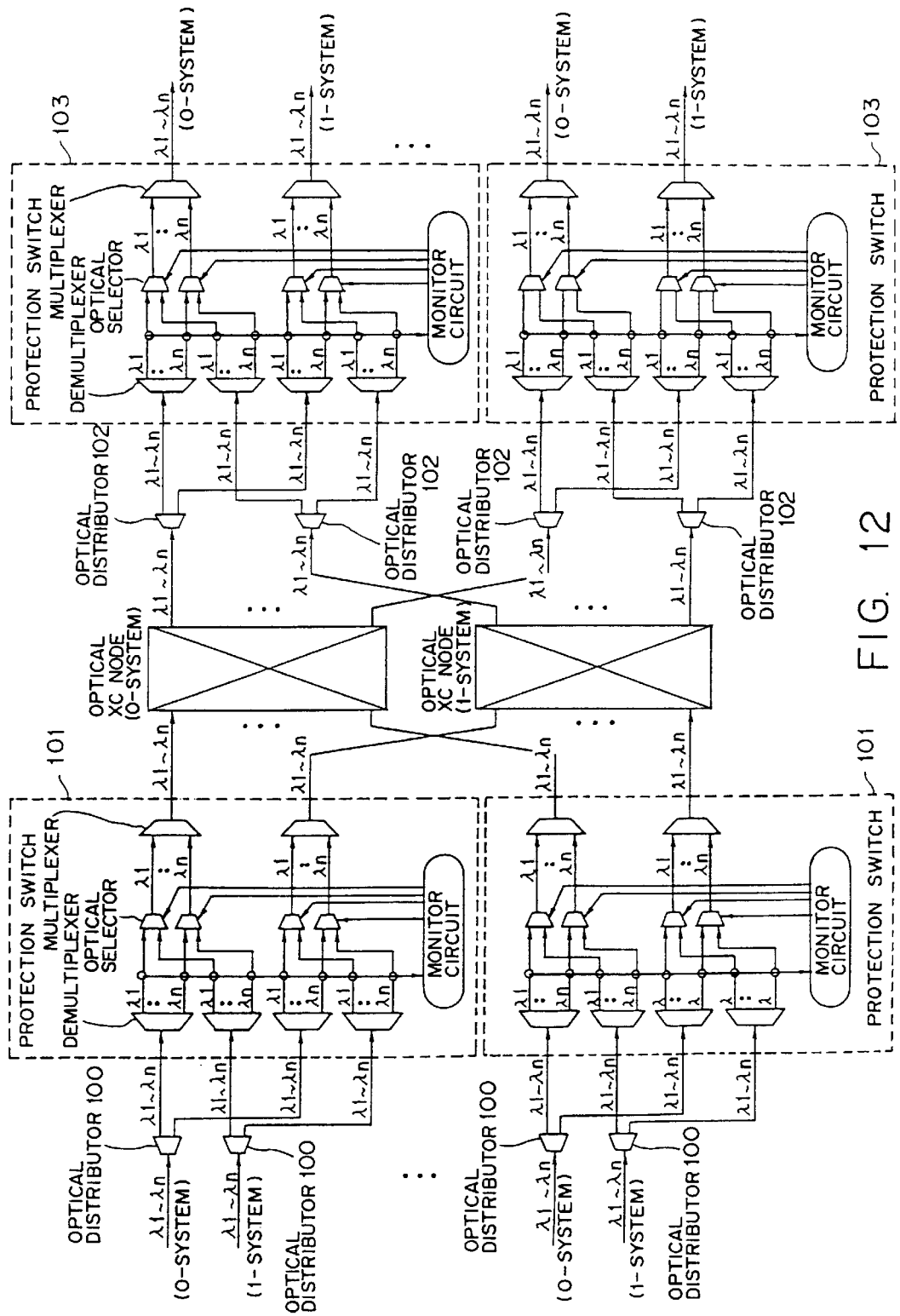
FIG. 12 is a block diagram showing a variation in which the optical distributor shown in FIG. 11 is provided before the protection switch.

FIG. 12 is a block diagram showing a variation in which the arrangement of the multiplexer and the optical demultiplexer shown in FIG. 11 is changed.

According to the configuration shown in FIG. 12, the wavelength-multiplexed optical signals outputted from the duplexed transmission lines are split by optical distributors 100 provided for a 0-system and a 1-system, and preliminarily the same optical signals to be distributed to the 0-system and 1-system optical XC nodes are generated. The optical signals which have been split by the optical distributor 100 are inputted to a protection switch 101. This protection switch switches between an optical signal to be transmitted to the 0-system optical XC node and an optical signal to be transmitted to a 1-system optical XC node. That is, one of the optical signals which have been split by the optical distributor 100 is demultiplexed by the demultiplexer, and the selector selects between a 0-system transmission line and a 1-system transmission line. A multiplexer multiplexes inputted optical signals to be transmitted to the 0-system optical XC node. The other of the optical signals which have been split by the optical distributor 100 is demultiplexed by the demultiplexer, and the selector selects between a 0-system transmission line and a 1-system transmission line. A multiplexer multiplexes inputted optical signals to be transmitted to the 1-system optical XC node.

In FIG. 12, a monitor circuit for controlling the optical selector in a protection switch 101 is commonly provided with a circuit for transmitting an optical signal to the 0-system optical XC node and a circuit for transmitting an optical signal to the 1-system optical XC node. However, monitor circuits can be provided for the respective circuits.

The optical signals outputted from the protection switch 101 are routed by the 0-system and 1-system optical XC nodes to be inputted to optical distributors 102 which are provided for the 0-system and 1-system optical XC nodes. An optical distributor 102 splits the optical signal outputted from the optical XC node (0-system or 1-system), and generates the same optical signals in order to generate optical signals to be transmitted to the 0-system and 1-system transmission lines. The optical signals outputted from the optical distributor 102 are inputted to a protection switch 103 to be switched between the optical signal to be transmitted to the 0-system transmission line and that to be transmitted to the 1-system transmission line. That is, a demultiplexer demultiplexes the wavelength-multiplexed optical signal outputted from the optical distributor 102, and the optical selector switches between the optical signal outputted from the 0-system optical XC node and that outputted from the 1-system optical XC node. The thus-switched optical signals are multiplexed by the multiplexer to be transmitted to the 0-system and 1-system optical transmission lines. The optical selector is controlled by a monitor circuit as mentioned above, but it is not necessary to provide a monitor circuit common to the 0-system transmission circuit and the 1-system transmission circuit. Therefore, a monitor circuit can be provided for each circuit.

According to the above-mentioned configuration, even if one of the optical selectors provided in the protection switch breaks down, the redundant configuration works effectively so that no problem will arise, by providing the optical distributor at the preceding stage of the protection switch (corresponding to the selector shown in FIG. 7B) and preliminarily duplexing optical signals as explained in FIG. 7B.

Figure 13:
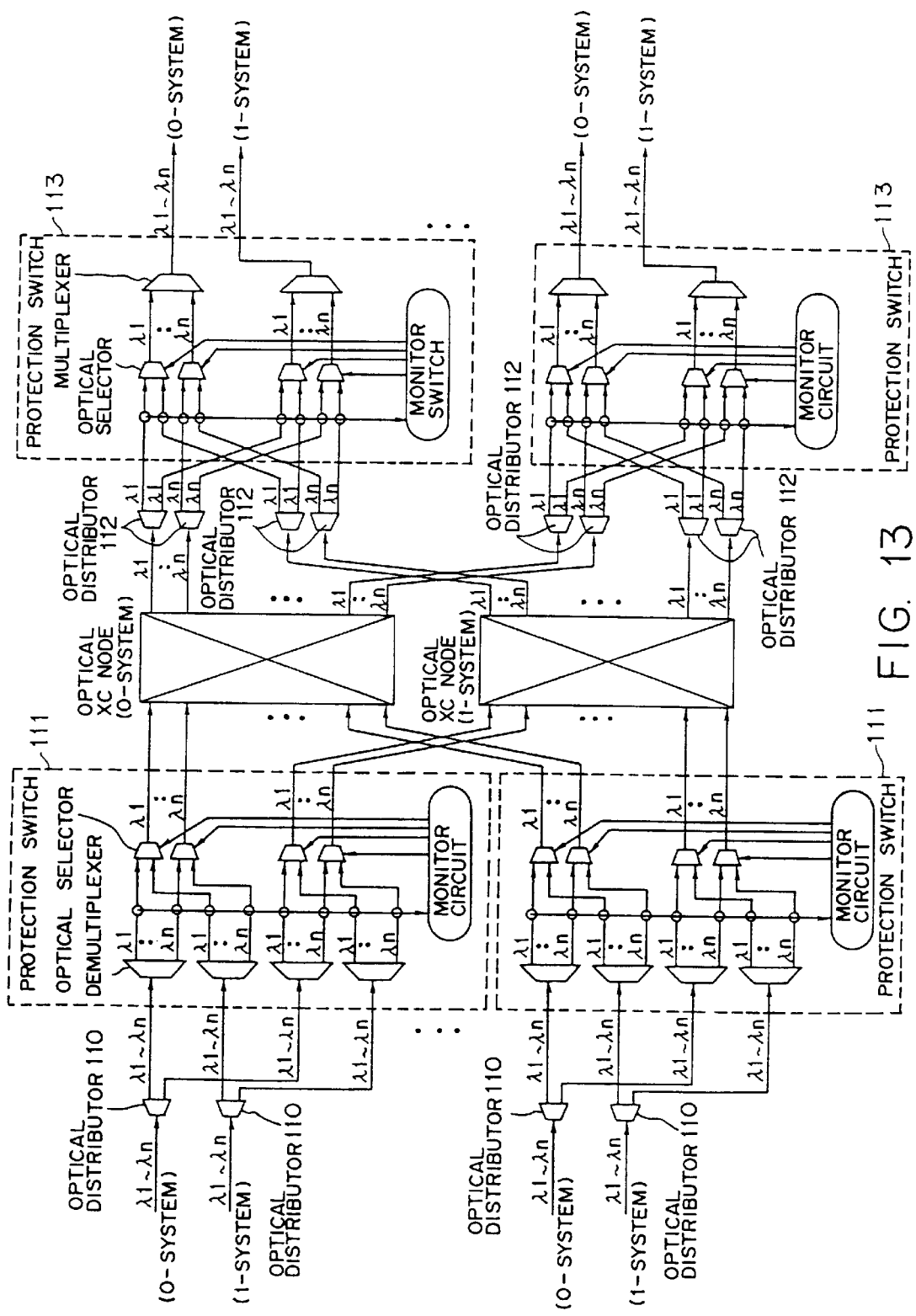
FIG. 13 is a block diagram showing another variation in which the optical distributor shown in FIG. 11 is provided before the protection switch.

FIG. 13 is a block diagram showing a configuration in which the optical distributor shown in FIG. 11 is provided before the protection switch.

In this figure, the optical XC node inputs wavelength-demultiplexed optical signals, but not the wavelength-multiplexed optical signals, routes these inputted optical signals, and outputs optical signals of the respective wavelengths. In this case, since it is not necessary to provide a demultiplexer or a multiplexer in the protection switch as shown in FIG. 12, they are omitted.

The wavelength-multiplexed optical signals inputted from the transmission lines which have been duplexed into a 0-system and a 1-system are inputted to a distributor 110 to be split into a 0-system optical XC node optical signal and a 1-system optical XC node optical signal. The thus-split optical signals are inputted to a protection switch 111 to be demultiplexed by the demultiplexer, and these optical signals are transmitted to optical selectors provided for the respective wavelengths. A monitor circuit monitors outputs of the demultiplexer for the respective wavelengths, detects the optical signal of a system in which a fault occurs, and controls the corresponding optical selector to switch this system to the other system. Optical signals of the respective wavelengths outputted from the optical selectors are directly inputted to the 0-system and 1-system optical XC nodes, and these optical signals are routed to be outputted. The thus-outputted optical signals of the respective wavelengths are inputted to an optical distributor 112. These optical signals are split into the same optical signals to generate a 0-system transmission line optical signal and a 1-system transmission line optical signal to be inputted to the optical signal selectors of a protection switch 113. The monitor circuit monitors the optical signals inputted to the protection switch 113, for the respective wavelengths, and detects whether or not a fault occurs on either the optical signal inputted from the 0-system optical XC node or that inputted from the 1-system optical XC node. If a fault is detected, the monitor circuit controls the optical selector to switch between the optical signals inputted from the 0-system optical XC node and those inputted from the 1-system optical XC node. The optical signals outputted from the optical selectors are multiplexed by the multiplexer to be transmitted to the 0-system and 1-system transmission lines as the wavelength-multiplexed optical signals.

According to the above-mentioned configuration, an optical signal is duplexed in the protection switch before systems are switched. Therefore, even if an optical selector which is more fragile than an optical distributor breaks down, the redundant configuration works effectively so that no significant problem will arise.

Figure 14:
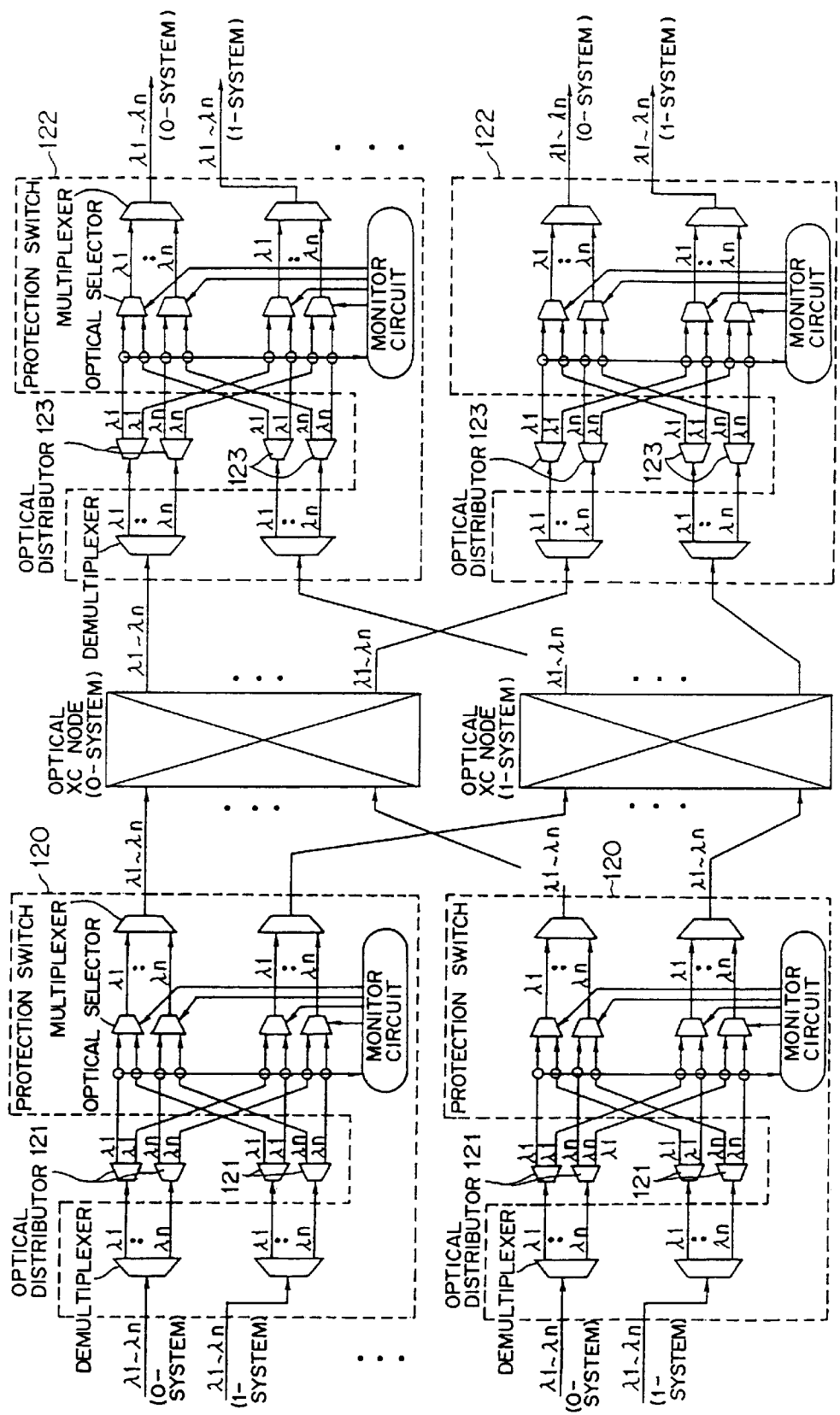
FIG. 14 is a block diagram showing a redundant configuration example of an optical XC system in which the location of the optical distributor shown in FIG. 12 is changed.

FIG. 14 is a block diagram showing an example of the redundant configuration of an optical XC system in which the arrangement of the optical distributor shown in FIG. 12 is changed.

In FIG. 14, the optical distributor 100 shown in FIG. 12 is provided at the downstream of a demultiplexer, and the same number of optical distributors 121 is provided as that of the optical signals of the respective wavelengths outputted from the demultiplexer.

The optical signals whose wavelengths $\lambda 1$ to $\lambda n$ have been multiplexed are inputted to a demultiplexer of a protection switch 120, from the transmission lines which are duplexed into a 0-system and a 1-system. The optical signals whose wavelengths have been multiplexed in the multiplexer are demultiplexed into the optical signals of the respective wavelengths. The optical signals of the respective wavelengths outputted from the demultiplexer are inputted to optical distributors 121 provided for the respective wavelengths. The optical distributor 121 splits the optical signal to generate the same optical signals for the optical signal of a 0-system optical XC node and that of a 1-system optical XC node. The thus-duplexed optical signals outputted from the optical distributor 121 are inputted to optical selectors whose number is the same as that of the optical distributors 121. The optical signals to be inputted to one optical selector are the corresponding optical signals of the same wavelengths outputted from the 0-system and the 1-system. The monitor circuit detects outputs from the optical distributor 121, and monitors each optical signal to detect a fault. When the monitor circuit detects a fault, it sends a signal to the optical selector to switch between a 0-system and a 1-system. The optical signals of the respective wavelengths outputted from the optical selector are multiplexed by the multiplexer to be inputted the 0-system and 1-system optical XC nodes. Optical signals which have been routed in the optical XC node are outputted as being wavelength-multiplexed, to be inputted to the demultiplexer of a protection switch 122. The multiplexer multiplexes the thus-inputted optical signals and transmits the optical signals of the respective wavelengths to the optical distributor 123. The optical distributor 123 duplexes the optical signals of each wavelength to be transmitted to the optical selector of the protection switch 122, similarly to the above-mentioned optical distributor 121. The monitor circuit monitors the respective outputs of the optical distributor 123 and activates the optical selector to switch between the systems according to the occurrence of a fault. The optical signals of the respective wavelengths outputted from the optical selectors are multiplexed by the multiplexer to be outputted to the respective transmission lines.

According to the above-mentioned configuration, even if one of the optical selectors breaks down, the redundant configuration works effectively so that a regular service can be offered to a subscriber without generating a significant problem, similarly to FIG. 12.

Figure 15:
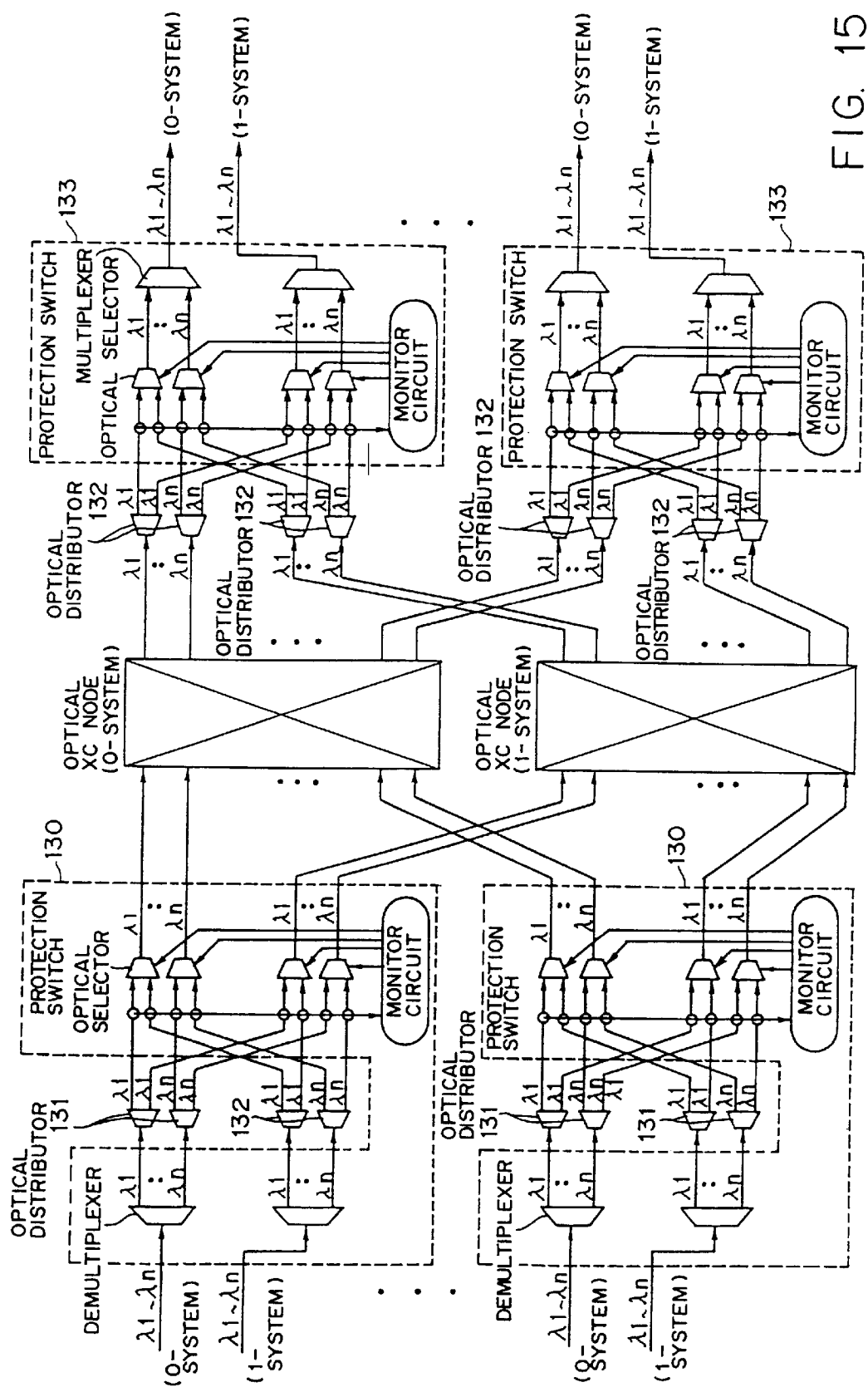
FIG. 15 is a block diagram showing a redundant configuration example of an optical XC system in which the location of the optical distributor shown in FIG. 13 is changed.

FIG. 15 is a block diagram showing an example of a redundant configuration of an optical XC system in which the arrangement of the optical distributor shown in FIG. 13 is changed.

This figure shows an example of a redundant configuration in the case where the optical XC node inputs optical signals of the respective wavelengths, but not the wavelength-multiplexed optical signals, and routes the thus-inputted optical signals, thereby outputting optical signals of the respective wavelengths.

When the wavelength-multiplexed optical signals are inputted from the transmission lines which have been duplexed into a 0-system and a 1-system, the demultiplexer of a protection switch 130 demultiplexes the wavelength-multiplexed optical signals into those of the respective wavelengths. The optical signals of the respective wavelengths outputted from the demultiplexer are transmitted to the optical distributors 131 provided for the respective wavelengths to be duplexed. The optical signals outputted from the optical distributor 131 are inputted to the optical selectors of the protection switch 130. A monitor circuit monitors the respective outputs from the optical distributor 131. When the monitor circuit detects a fault, it operates the optical selector to select either the optical signal outputted from the 0-system transmission line or that outputted from the 1-system transmission line. The optical signals outputted from the optical selectors are inputted to the 0-system and 1-system optical XC nodes for the respective wavelengths. The respective optical signals are routed by the optical XC node to be outputted for the respective wavelengths, and the thus-outputted optical signals are inputted to optical distributors 132. The optical distributor 132 duplexes each optical signal to be inputted to the optical selector of a protection switch 133. The monitor circuit monitors the respective outputs from an optical distributor 132, and operates the optical selector to select one of the optical signal from the 0-system optical XC node and the optical signal from the 1-system optical XC node. The optical signals of the respective wavelengths outputted from the optical selectors are inputted to a multiplexer to be multiplexed, and the thus-multiplexed optical signals are outputted to the 0-system transmission line or the 1-system transmission line.

Since a duplex operation for the redundancy is performed by an optical selector before systems are switched by the optical selector, as shown in FIGS. 12, 13, and 14, a communication service can be continuously supplied as usual, even if one of the optical selectors breaks down.

FIG. 16 is a block diagram showing an example of the configuration of a monitor circuit in the case where a 2×2 switch is used as an optical selector.

In this configuration, the monitor circuit comprises optical signal detectors 141 and 142 for the respective systems, a determination circuit 146, and an optical switch drive circuit 147. In the optical signal detectors 141 and 142 (since the inside configuration of the optical signal detector 142 is the same as that of 141, this configuration is not shown in FIG. 16), an input optical signal is converted into electricity (current) by an opto/electric convertor 143. Further, this electricity (current) is converted into a voltage by a current/voltage convertor 144. The value of this voltage is compared with a reference voltage by a comparator 145, and the presence of an optical signal is determined. That is, since optical signals are not transmitted when a fault such as the disconnection of a transmission line or the like occurs in the present system, the value of the voltage becomes lower than the reference value. The outputted optical signals from the optical signal detectors 141 and 142 are inputted to the determination circuit 146. The determination circuit 146 transmits a control signal to an optical switch, judging from the conditions of the inputted optical signals from both systems. The optical switch drive circuit 147 outputs an ON/OFF signal to the 2×2 optical switch which works for the optical selector.

Figure 17:
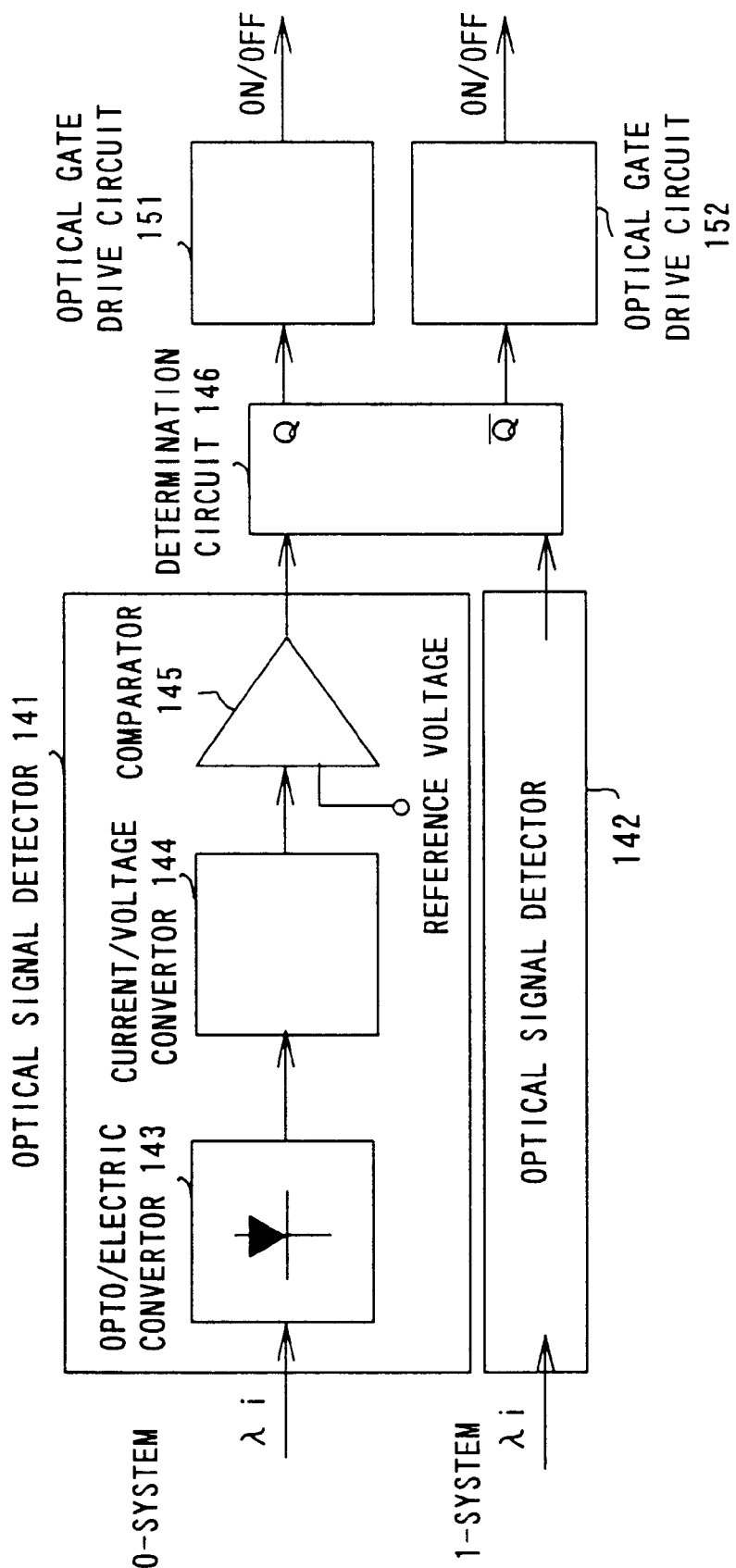
FIG. 17 is a block diagram showing a configuration example of a monitor circuit in the case where an optical signal gate is used as an optical selector.

FIG. 17 is a block diagram showing an example of the configuration of a monitor circuit in which an optical gate is used as an optical selector.

In this figure, the same numerals as those shown in FIG. 16 indicate the same elements.

In the case where an optical gate is used as an optical selector, two drive circuits are required since two optical gates are used. That is, when the optical signal detectors 141 and 142 provided for the respective systems receive optical signals from the respective systems, the thus-received optical signals are converted into electricity (current) by the opto/electric convertor 143. Then, this current is converted into a voltage by the current/voltage convertor 144 to be transmitted to the comparator 145. The comparator 145 compares the value of the voltage outputted from the current/voltage convertor 144 with the reference voltage, and thereby detects the presence of an optical signal. The determination circuit 146 determines on which system a fault occurs according to the comparison results obtained from the optical signal detectors 141 and 142, and transmits a control signal to the optical gate drive circuits 151 and 152. At this time, control signals outputted from the determination circuit 146 are generated for the optical gate drive circuits 151 and 152. When one control signal is an instruction to open the optical gate, the other control signal is an instruction to close the optical gate. Thus, two optical gates provided as optical selectors are controlled in such a way that one gate is open while the other gate is closed. Each of the optical gate drive circuits 151 and 152 transmits an ON/OFF signal for driving a corresponding optical gate according to the control signal supplied by the determination circuit 146.

In the above-mentioned embodiments, the explanations are based on a fact that an optical switch or an optical gate is used as an optical selector. A multi-wavelength selection filter can also be used for the optical selector (a device capable of selecting a plurality of optional wavelengths from the wavelength-multiplexed optical signal). As a multi-wavelength selection filter, an acousto-optical filter can be used. This filter can select the optical signal of an optional wavelength by changing the frequency of an RF signal to be externally supplied. The optical signals of a plurality of wavelengths can be selected by applying a plurality of RF signals. In respect of the detail of the acousto-optical filter, please refer to a document such as the bulletin of the Electro Information Communication Society OPE96-123 (published in December, 1996).

Figure 18A:
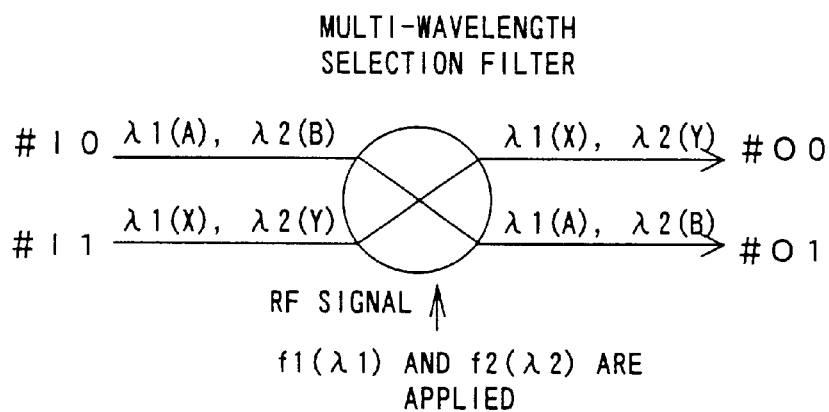
FIGS. 18A to 18C are diagrams showing configuration examples in the case where a 2-input and 2-output type multi-wavelength selection filter is used as a protection switch.
Figure 18B:
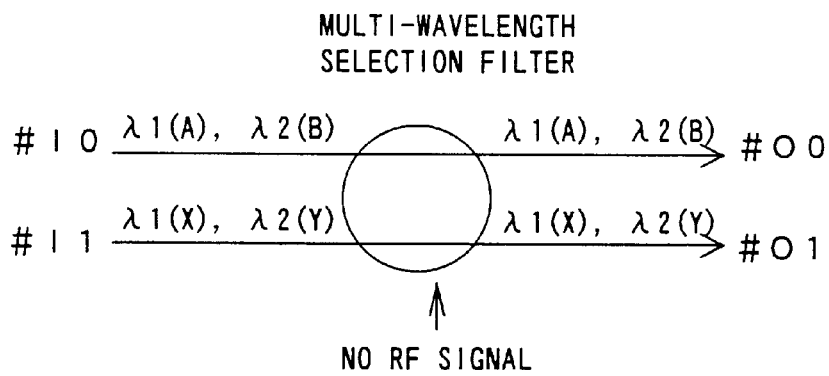
Figure 18C:
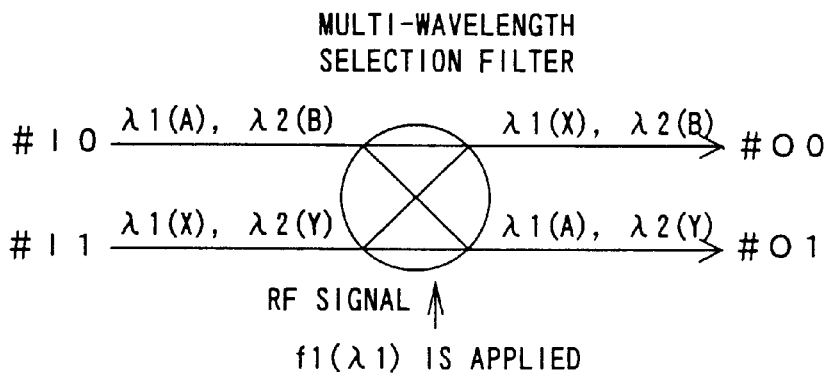

FIGS. 18A to 18C are diagrams showing examples of a configuration in the case where a 2-input and 2-output type multi-wavelength selection filter is used as a protection switch.

If the 2-input and 2-output type multi-wavelength selection filter is used as a protection switch for the redundancy of an optical XC system, only one of the two outputs is used. The frequency f1 of an RF signal corresponds to a wavelength $\lambda 1$, while the frequency f2 of an RF signal corresponds to a wavelength $\lambda 2$. In such a filter, optical signal of a wavelength corresponding to the frequency of the thus-applied RF signal is crossed (output #1 from input #0, and output #0 from input #1).

For example, when an optical signal of frequencies f1 and f2 is applied to the multi-wavelength selection filter (for example, an acousto-optical filter) as an RF signal, the optical path of the optical signal of wavelengths $\lambda 1$ and $\lambda 2$, which has propagated through the 0-system transmission line, is exchanged with that of the optical signal of wavelengths λ1 and λ2, which has propagated through the 1-system transmission line. Therefore, the optical signal inputted to the multi-wavelength selection filter from the 0-system transmission line is outputted to the 1-system transmission line. Similarly, the optical signal inputted to the multi-wavelength selection filter from the 1-system transmission line is outputted to the 0-system transmission line.

Further, in the case where an RF signal is not applied to the multi-wavelength selection filter as shown in FIG. 18B, the optical signal inputted to the multi-wavelength selection filter from the 0-system transmission line is outputted to the 0-system transmission line. The optical signal inputted to the multi-wavelength selection filter from the 1-system transmission line is outputted to the 1-system transmission line.

As shown in FIG. 18C, by contrast, when the optical signal of a frequency f1 is applied to the multi-wavelength selection filter as an RF signal, the optical path of the optical signal of the corresponding wavelength λ1 is switched. That is, assume that the optical signal of wavelengths λ1 and λ2 is inputted to the multi-wavelength selection filter from the 0-system transmission line, and the optical signal of wavelengths λ1 and λ2 is inputted to the multi-wavelength selection filter from the 1-system transmission line. Then, the optical signal of wavelength λ1 outputted from the 1-system transmission line and that of wavelength λ2 outputted from the 0-system transmission line are inputted to the 0-system output transmission line. Similarly, the optical signal of wavelength λ1 outputted from the 0-system transmission line and that of wavelength λ2 outputted from the 1-system transmission line are inputted to the 1-system output transmission line.

Thus, if a multi-wavelength selection filter is used, it is possible to only switch the optical path of the optical signal of a desired wavelength among inputted optical signals of a plurality of wavelengths, by suitably establishing a frequency of an RF signal which is applied to the multi-wavelength selection filter. Therefore, if the number of multiplexing times of the wavelength of an optical signal to be inputted is not 2, that is, the number is much greater than 2, only the optical path of an optical signal of a desired wavelength can be switched. Further, by using one of the two outputs, this filter can be used as an optical selector which is necessary for the redundant configuration of the optical XC system.

Figure 19A:
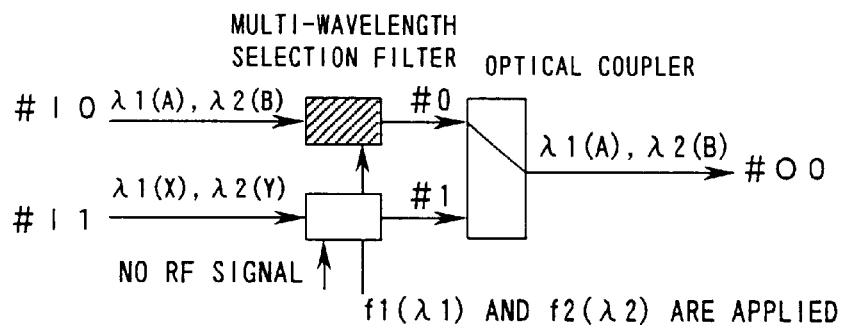
FIGS. 19A to 19C are diagrams showing configuration examples in the case where a 1-input and 1-output type multi-wavelength selection filter and an optical signal coupler are used as a protection switch.
Figure 19B:
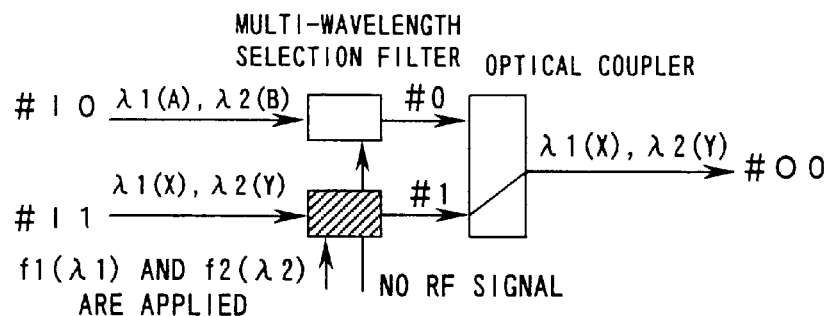
Figure 19C:
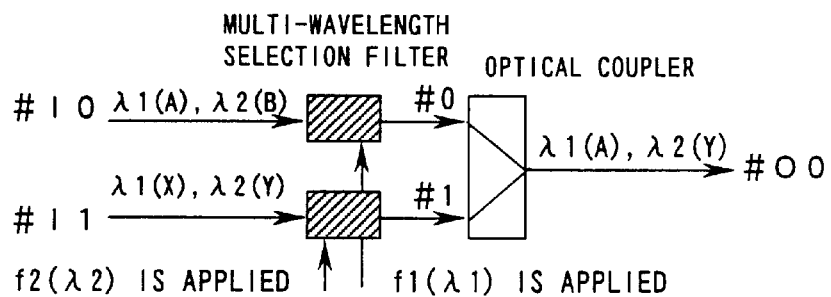

FIGS. 19A to 19C are diagrams showing examples of a configuration in the case where a 1-input and 1-output type multi-wavelength selection filter and an optical coupler are used as a protection switch.

The frequency f1 of an RF signal corresponds to a wavelength λ1, while the frequency f2 of an RF signal corresponds to a wavelength λ2, as shown in the examples of a configuration shown in FIGS. 18A to 18C. In such examples, the optical signal of a wavelength corresponding to the frequency of the thus-applied RF signal is outputted.

According to FIGS. 19A to 19C, the multi-wavelength selection filter to which an RF signal is not applied, does not output an optical signal. In the case where the RF signal of frequencies f1 and f2 is applied to a 0-system multi-wavelength selection filter, but no RF signal is applied to a 1-system multi-wavelength selection filter in FIG. 19A, only the 0-system multi-wavelength selection filter passes the transmitted optical signals. Therefore, the optical signal of wavelengths λ1 and λ2 which has propagated through the 0-system transmission line is outputted to an optical multiplexer to be outputted to a 0-system output transmission line. FIG. 19B shows the case where the RF signal of frequencies f1 and f2 is applied to the 1-system multi-wavelength selection filter, but no RF signal is applied to the 0-system multi-wavelength selection filter. According to this figure, the 0-system multi-wavelength selection filter does not pass the optical signal which has propagated from the 0-system transmission line. On the other hand, the 1-system multi-wavelength selection filter passes the optical signal of wavelengths A1 and λ2 which has propagated through the 1-system transmission line, and outputs this optical signal to a 0-system output transmission line through the optical coupler. FIG. 19C shows the case where RF signals are respectively applied to the 0-system and the 1-system multi-wavelength selection filters. In FIG. 19C, the RF signal of a frequency f1 is applied to the 0-system multi-wavelength selection filter, and the RF signal of a frequency f2 is applied to the 1-system multi-wavelength selection filter. According to this figure, only the optical signal of a wavelength λ1 among the optical signals which have propagated through the 0-system transmission line is transmitted to the optical signal multiplexer, and only the optical signal of a wavelength λ2 among the optical signals which have propagated through the 1-system transmission line is transmitted to the optical signal multiplexer. Therefore, the optical coupler couples the optical signal of wavelength λ1 outputted from the 0-system, and the optical signal of wavelength λ2 outputted from the 1-system, to be transmitted to the 0-system transmission line.

A 1-input and 1-output multi-wavelength selection filter can be configured by the above-mentioned 2-input and 2-output multi-wavelength selection filter. That is, one of the inputs from the 0-system or the 1-system is not used, but instead the output of a system different from the system of an input, which is currently being used, can be used. In FIGS. 18A to 18C, if the input of the 0-system and the output of the 1-system are used, in the case where an RF signal is not applied to the multi-wavelength selection filter, optical signals are not outputted, and only the optical signal of a wavelength which corresponds to the RF signal of the applied frequency, is outputted. Similarly, the input of the 1-system and the output of the 0-system can be used.

Figure 20:
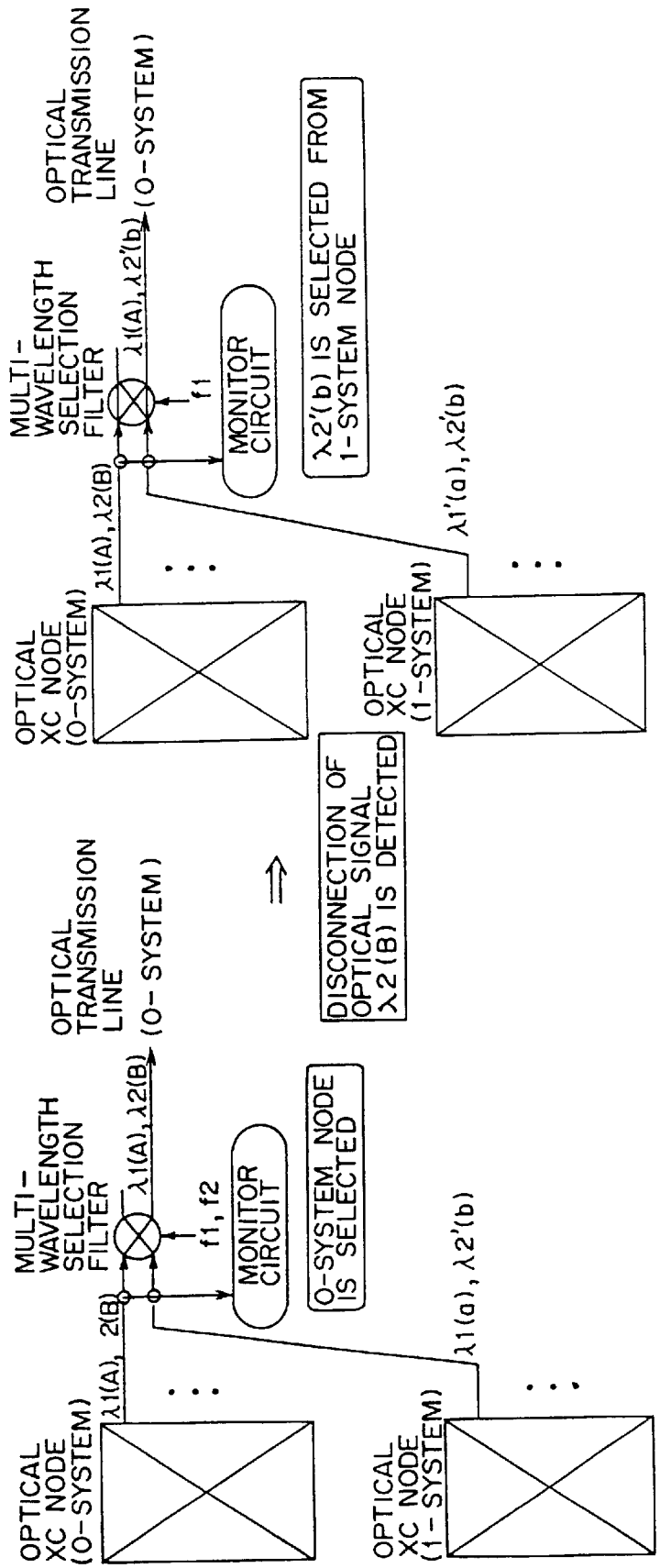
FIG. 20 is a diagram (No. 1) showing one embodiment of the present invention in the case where a 2-input and 2-output type multi-wavelength selection filter is used.
Figure 21:
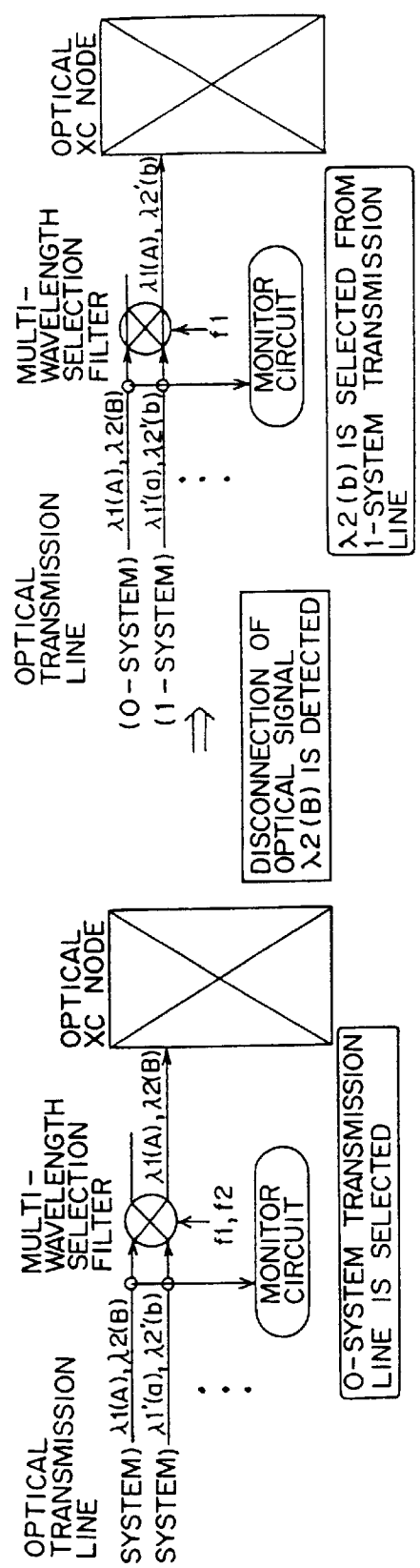
FIG. 21 is a diagram (No. 2) showing one embodiment in the case where a 2-input and 2-output type multi-wavelength selection filter is used.

FIGS. 20 and 21 are diagrams explaining embodiments in the case where a 2-input and 2-output multi-wavelength selection filter is used.

FIG. 20 is a diagram showing an example of a configuration in which paths are switched at a node output portion. A multi-wavelength selection filter selects a wavelength-multiplexed optical signal (two wavelengths, in this case) outputted from a 0-system node. Assume that a fault in the optical signal of wavelength λ2 is detected. In this case, only the optical signal of wavelength λ2 is switched from a 0-system to a 1-system by eliminating the RF signal of a frequency f2 which has applied to the multi-wavelength selection filter from a monitor circuit.

That is, the optical signal in which wavelengths λ1 and λ2 have been multiplexed is outputted from the 0-system optical XC node to the multi-wavelength selection filter. Similarly, the optical signal of wavelengths λ1 and λ2 is outputted from the 1-system optical XC node to the multi-wavelength selection filter. Here, assume that the frequency f1 of an RF signal corresponds to the wavelength λ1 of the optical signal, and the frequency f2 of an RF signal corresponds to the wavelength λ2 of the optical signal. Then, if the optical signal of frequencies f1 and f2 is applied to the multi-wavelength selection filter from the monitor circuit, the optical signal of wavelengths λ1 and λ2 outputted from the 0-system optical XC node is switched to the output side to be outputted by the multi-wavelength selection filter.

Next, when the monitor circuit detects that a fault occurs on the optical signal of wavelength λ2 among the optical signals outputted from the 0-system optical XC node, the monitor circuit stops the application of the RF signal of a frequency f2 to the multi-wavelength selection filter. Then, the optical signal of a wavelength λ2 of the 1-system (indicated by λ2') is outputted to the output of the multi-wavelength selection filter. The optical signal of a wavelength λ1 outputted from the 0-system optical XC system and the optical signal of wavelength λ2 outputted from the 1-system optical XC node are outputted to the output transmission line.

Thus, only the system of the optical signal of a wavelength in which a fault occurs can be switched by using the multi-wavelength selection filter.

FIG. 21 is a diagram showing an example of a configuration in which the input transmission lines to a node are switched. A multi-wavelength selection filter selects the wavelength-multiplexed optical signal (two wavelengths, in this case) outputted from a 0-system transmission line. Assume that a fault in the optical signal of a wavelength λ2 is detected. In this case, only the optical signal of the wavelength λ2 is switched from a 0-system to a 1-system by eliminating the RF signal of a frequency f2 which was applied to the multi-wavelength selection filter.

FIG. 21 shows an example of a redundant configuration performed on the input side of the optical XC node when a transmission line has redundancy. The optical signal outputted from the 0-system transmission line and that from the 1-system transmission line are inputted to the multi-wavelength selection filter. The 0-system and 1-system transmission lines respectively propagate the same optical signals of wavelengths λ1 and λ2, and these signals are monitored by a monitor circuit before the inputs of the multi-wavelength selection filter. While the monitor circuit is applying the RF signal of frequencies f1 and f2, only the optical signal of wavelengths λ1 and λ2 outputted from the 0-system is inputted to the optical XC node. Next, when the monitor circuit detects a fault in the optical signal of wavelength λ2 of the 0-system, the application of the RF signal of a frequency f2 among the RF signals to be applied to the multi-wavelength selection filter is stopped. Then, the optical signal of a wavelength λ2 which has propagated through the 1-system transmission line (indicated by λ2') is outputted from the multi-wavelength selection filter to be inputted to the optical XC node.

Figure 22:
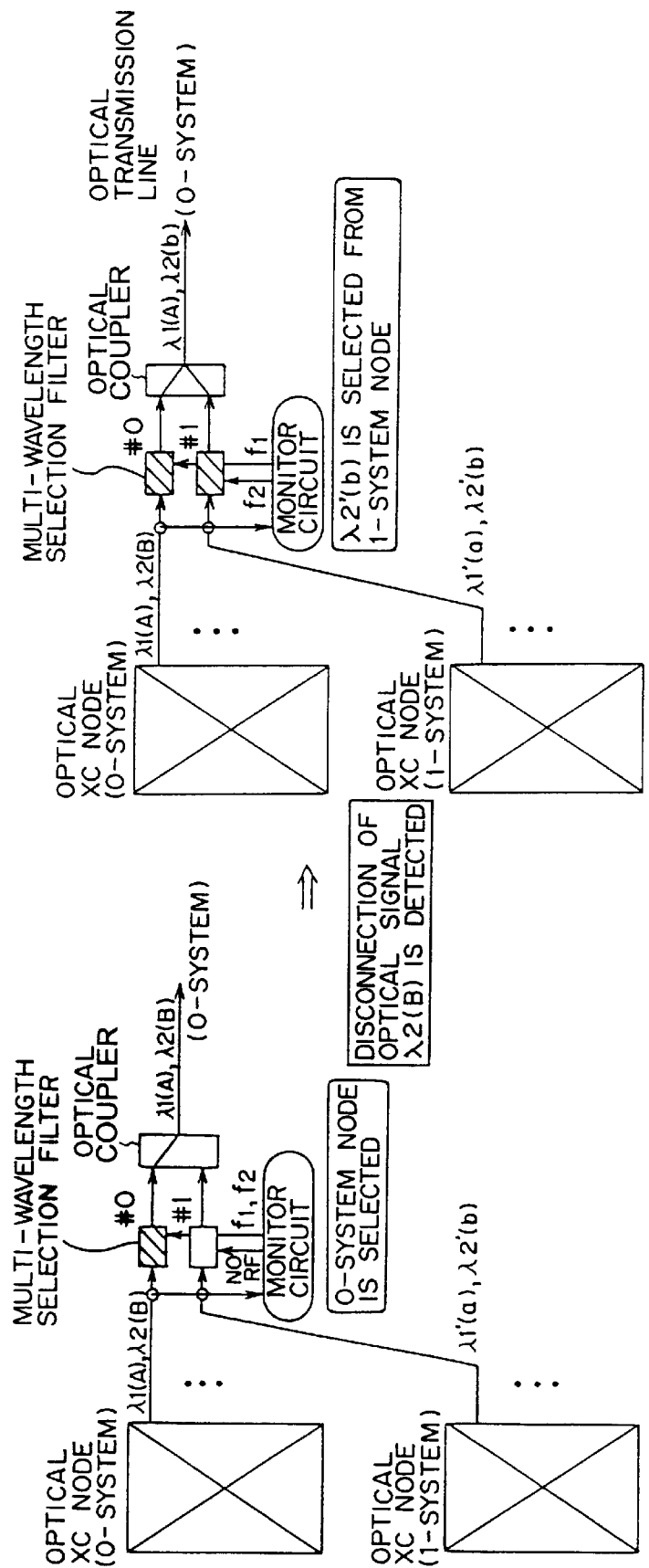
FIG. 22 is a diagram (No. 1) showing a configuration example in the case where a 1-input and 1-output type multi-wavelength selection filter is used.
Figure 23:
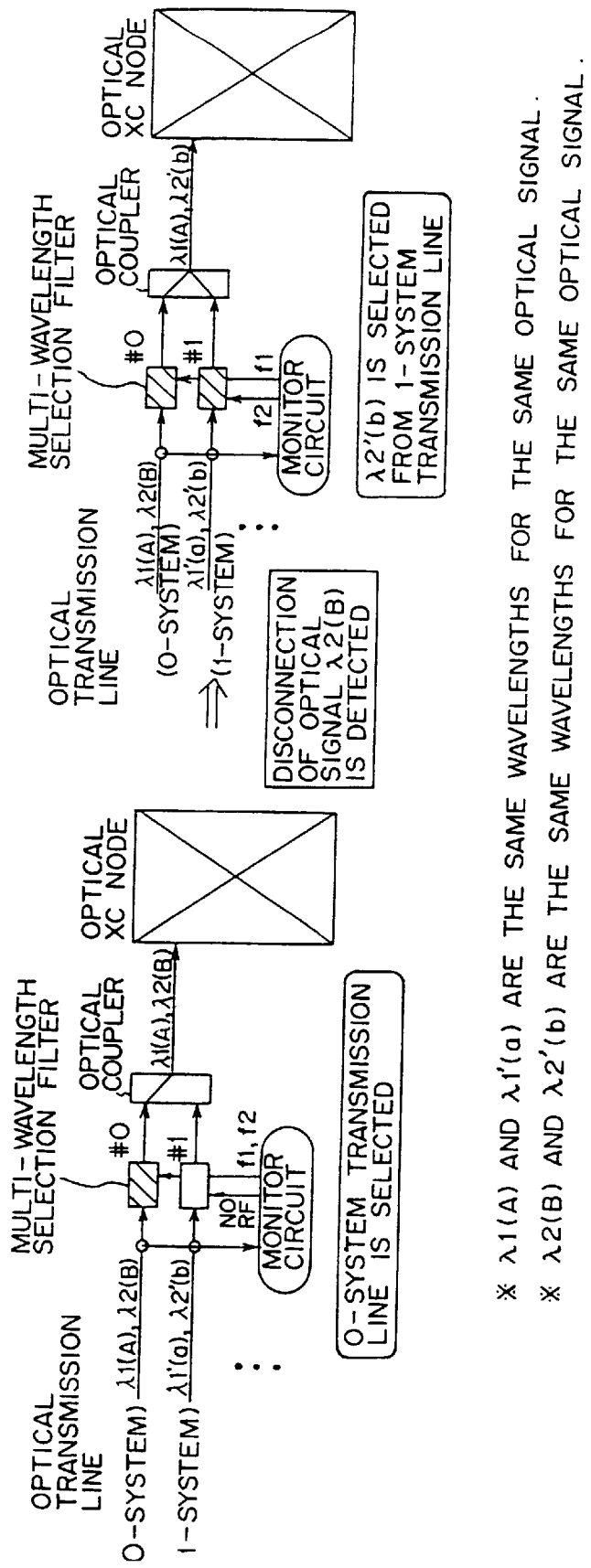
FIG. 23 is a diagram (No. 2) showing a configuration example in the case where a 1-input and 1-output type multi-wavelength selection filter is used.

FIGS. 22 and 23 are diagrams showing examples of a configuration in which a 1-input and 1-output multi-wavelength selection filter is used.

FIG. 22 is a diagram showing an example of a configuration in which paths are switched at a node output portion. A multi-wavelength selection filter selects a wavelength-multiplexed optical signal (two wavelengths, in this case) outputted from a 0-system node. Assume that a fault in the optical signal of wavelength λ2 is detected. In this case, only the optical signal of wavelength λ2 is switched from a 0-system to a 1-system by eliminating the RF signal of a frequency f2 which was applied to the multi-wavelength selection filter provided on the 0-system side, and by applying the RF signal of a frequency f2 to the multi-wavelength selection filter provided on the 1-system side.

That is, the optical XC node is duplexed into a 0-system and a 1-system. The optical signal of wavelengths λ1 and λ2 outputted from each of the optical XC nodes (indicated by λ1' and λ2' for the optical signal outputted from the 1-system optical XC node) is inputted to the multi-wavelength selection filter.

Since a 1-input and 1-output type is used as a multi-wavelength selection filter in this configuration, a 1-system filter and a 0-system filter are provided. The monitor circuit does not first apply an RF signal to the 1-system multi-wavelength selection filter, but applies the RF signal of frequencies f1 and f2 to the 0-system multi-wavelength selection filter. Accordingly, the optical signal of wavelengths λ1 and λ2 outputted from the 0-system optical XC node is outputted to the optical transmission line through the multi-wavelength selection filter and the optical multiplexer.

Since the monitor circuit monitors the outputs of the 0-system and the 1-system optical XC nodes, when a fault is detected in the output of the 0-system, the optical signal of a wavelength in which a fault occurs is switched to that of a 1-system. FIG. 22 shows the case where a fault is detected in the optical signal of λ2 among the optical signals outputted from the 0-system optical XC node. In this case, as shown in the right of this figure, the monitor circuit applies the RF signal of a frequency f1 to the 0-system multi-wavelength selection filter and the RF signal of a frequency f2 to the 1-system multi-wavelength selection filter. Thus, the 0-system multi-wavelength selection filter outputs only the optical signal of a wavelength λ1 among the optical signals outputted from 0-system optical XC node, and the 1-system multi-wavelength selection filter outputs only the optical signal of a wavelength λ2 (indicated by λ2') among the optical signals outputted from the 1-system optical XC node. These optical signals are multiplexed by the optical multiplexer to be outputted to the optical transmission line.

FIG. 23 is a diagram showing an example of a configuration in which input transmission lines to a node are switched.

A multi-wavelength selection filter selects a wavelength-multiplexed optical signal (two wavelengths, in this case) outputted from a 0-system node. Assume that a fault is detected in the optical signal of wavelength λ2. In this case, only the optical signal of wavelength λ2 is switched from a 0-system to a 1-system by eliminating the RF signal of a frequency f2 which was applied to the multi-wavelength selection filter provided on the 0-system side, and by applying the RF signal of a frequency f2 to the multi-wavelength selection filter provided on the 1-system side.

That is, optical signals are inputted to the multi-wavelength selection filters which are provided for the respective systems, from the transmission lines duplexed into a 0-system and a 1-system. The monitor circuit monitors optical signals outputted from the respective systems before the inputs of the multi-wavelength selection filters. On the left of FIG. 23, an optical signal propagating through the 0-system transmission line is used. In order to do so, the monitor circuit applies the RF signal of frequencies f1 and f2 to the 0-system multi-wavelength selection filter, but does not apply an RF signal to the 1-system multi-wavelength selection filter. Therefore, the optical signal of wavelengths λ1 and λ2 which has propagated through the 0-system transmission line is transmitted to the optical coupler to be inputted to the optical XC node.

FIG. 23 shows a control method in the case where a fault occurs on the optical signal of a wavelength λ2 between the optical signals from the 0-system. In this case, the monitor circuit applies the RF signal of a frequency f1 to the 0-system multi-wavelength selection filter, and applies the RF signal of a frequency f2 to the 1-system multi-wavelength selection filter. Then, the optical signal of wavelength λ1 between the optical signals which have propagated through the 0-system transmission line, and the optical signal of wavelength λ2 (indicated by λ2') between the optical signals which have propagated through the 1-system transmission line are inputted to the optical signal coupler. The optical coupler couples these optical signals to be inputted to the optical XC node.

In the above-mentioned, as for the optical signals which have propagated through transmission lines, the optical signal of only two wavelengths is multiplexed. However, the optical signals of wavelengths more than 2 can be multiplexed.

A redundant configuration of an optical XC system which uses a redundant configuration at a node output portion, and also uses a redundant configuration at the input transmission line to a node, according to the present embodiment in which a multi-wavelength selection filter is used as an optical selector, can be configured by switching the selector as shown in the redundant configuration of FIGS. 4 and 5 with a multi-wavelength selection filter. Therefore, an example of the redundant configuration of an optical XC system using a multi-wavelength selection filter is omitted.

Figure 24:
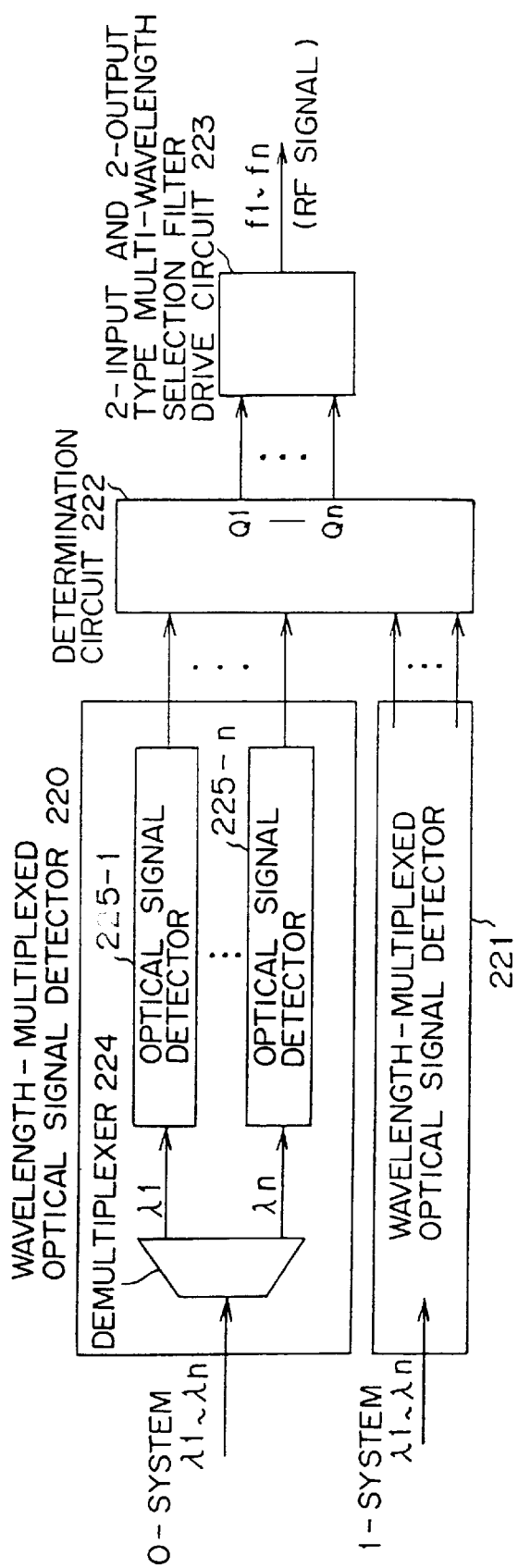
FIG. 24 is a block diagram showing a configuration example of a monitor circuit to be used in an optical XC system comprising a 2-input and 2-output type multi-wavelength selection filter.

FIG. 24 is a diagram showing an example of the configuration of a monitor circuit to be used for a redundant configuration of an optical XC system using a 2-input and 2-output type multi-wavelength selection filter.

According to the configuration shown in FIG. 24, in order to handle a wavelength-multiplexed optical signal, optical signal detectors 225-1 to 225-n (the configuration of these detectors is the same as that shown in FIG. 3) are required for the respective wavelengths, in wavelength-multiplexed optical signal detectors 220 and 221. When the optical signals of wavelengths λ1–λn, which are inputted from transmission lines are inputted to the wavelength-multiplexed optical signal detectors 220 and 221, the thus-inputted optical signals are demultiplexed into optical signals of the respective wavelengths by a demultiplexer 224. The thus-demultiplexed optical signals of the respective wavelengths are inputted to the respective optical signal detectors 225-1 to 225n, and it is detected whether or not a fault has occurred in these optical signals. In FIG. 24, however, the configuration inside the wavelength-multiplexed optical signal detector 221 of the 1-system is omitted.

The optical signals outputted from the optical signal detectors 225-1 to 225-n of the 0-system (the optical signal detectors of the 1-system are not shown), which are provided for the respective wavelengths, are inputted to a determination circuit 222. Then a control signal is transmitted to a multi-wavelength selection filter according to the conditions of the thus-inputted optical signals for the respective wavelengths. A 2-input and 2-output type multi-wavelength selection filter drive circuit 223 which has received the control signal outputs an RF signal to a multi-wavelength selection filter based on the thus-received control signal. The multi-wavelength selection filter can switch an optical signal with another optical signal of a suitable wavelength by providing an RF signal of various frequencies.

Figure 25:
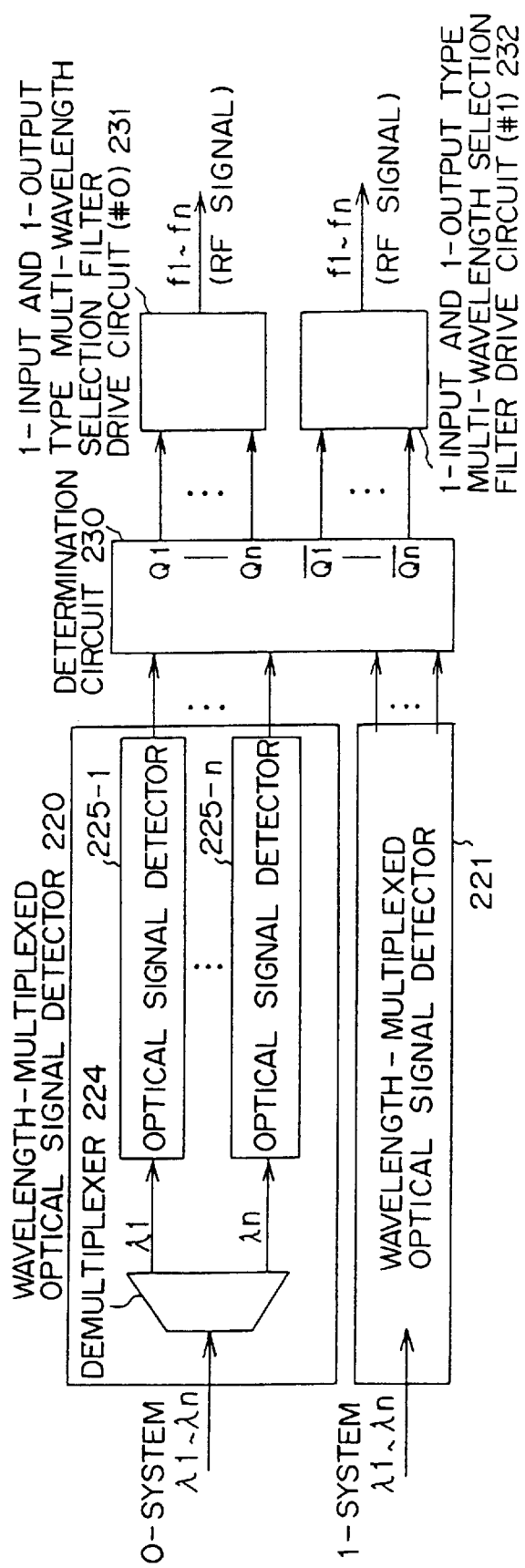
FIG. 25 is a block diagram showing a configuration example of a monitor circuit to be used in an optical XC system comprising a 1-input and 1-output type multi-wavelength selection filter.

FIG. 25 is a diagram showing an example of the configuration of a monitor circuit to be used for a redundant configuration of an optical XC system using a 1-input and 1-output type multi-wavelength selection filter.

In this figure, the same numerals as those shown in FIG. 24 indicate the same elements. The optical signals of wavelengths λ1 to λn inputted from a 0-system and a 1-system are demultiplexed into the optical signals of the respective wavelengths by a demultiplexer 224 provided in the wavelength-multiplexed optical signal detectors 220 and 221. The thus-demultiplexed optical signals are inputted to the optical signal detectors 225-1 to 225-n which are provided for the respective wavelengths. The optical signal detectors 225-1 to 225-n monitor a fault of the thus-inputted optical signals. When these detectors detect that the power level of the optical signal is smaller than the reference value due to any fault, they transmit this signal to a determination circuit 230. The determination circuit 230 has output terminals Q1 to Qn corresponding to the respective wavelengths and Q1 bar to Qn bar which are the inverse of Q1 to Qn. The determination circuit 230 transmits a control signal for switching between the 0-system multi-wavelength selection filter and the 1-system multi-wavelength selection filter, to 1-input and 1output type multi-wavelength selection filter drive circuits 231 and 232. This control signal is outputted from the output terminal corresponding to the optical signal of a wavelength in which a fault has been detected, and the inverted output terminal. In the case of the 1-input and 1-output type multi-wavelength selection filter, two drive circuits are required since two filters are used. In this case, while one drive circuit outputs fi (i=1, 2, . . . , n) as an RF signal, the other drive circuit does not output fi.

As mentioned above, according to the present invention, a demultiplexer for each system, an optical signal selector, and a multiplexer for each wavelength are used at a node output portion and an input transmission line to a node in a protection switch, in an optical XC system in which a node or a transmission line is duplexed. The present invention has an effect such that the optical signal of a normal wavelength will not be affected (a transmission quality will not deteriorate) by only switching the system of the optical signal of the wavelength in which a fault occurs with the other switch, so that the present invention can significantly contribute to the increase of efficiency of a wavelength-multiplexed optical signal transmission system using this redundant configuration.

Further, the present invention can easily obtain an effect such that the optical signal of a normal wavelength will not be affected (a transmission quality will not deteriorate) by using a multi-wavelength selection filter and by switching the system of the optical signal of a wavelength in which a fault has been detected with the other system.

What is claimed is:

1. An optical wavelength multiplexing system including a plurality of input and output optical fibers for transmitting wavelength-multiplexed optical signals, for processing the optical signals for each wavelength, comprising:
    an output side of a node duplexed into a first system and a second system, and a protection switch having:
        a demultiplexer for demultiplexing optical signals to be inputted after their wavelengths have been multiplexed, into optical signals of respective wavelengths;
        an optical selector provided for each wavelength, for selecting optical signals outputted from either one of the duplexed nodes; and
        a multiplexer for multiplexing optical signals of respective wavelengths transmitted from the optical selector, and
        wherein when a fault is detected in an optical signal of a certain wavelength included in optical signals transmitted from either one of the systems, the optical selector only switches an optical signal of the wavelength in which the fault is detected, into the other system.

2. The optical wavelength multiplexing system according to claim 1, wherein an optical signal distributor is provided at an output of the protection switch, and wavelength-multiplexed optical signals are distributed to duplexed transmission lines.

3. The optical wavelength multiplexing system according to claim 1, wherein optical signal distributors and duplexed protection switches are provided on an output side of the node, and a wavelength-multiplexed optical signal is split by the optical distributor to be distributed to the duplexed protection switches.

4. The optical wavelength multiplexing system according to claim 1, wherein a transmission line is duplexed into a third system and a fourth system on an output side of the node, the protection switch has a configuration such that the demultiplexer and the optical selector are provided corresponding to the third and the fourth system, an optical distributor for splitting an optical signal outputted from the demultiplexer is provided for each wavelength between the demultiplexer and the optical selector, and thus-split optical signals are respectively distributed to the optical selectors provided corresponding to the third system and the fourth system.

5. An optical wavelength multiplexing system including a plurality of input and output optical fibers for transmitting wavelength-multiplexed optical signals, for processing the optical signals for each wavelength, comprising:
   an output side of a node duplexed into a first system and a second system, a protection switch having:
      an optical selector provided for each wavelength, for selecting optical signals outputted from either one of the duplexed nodes; and
      a multiplexer for multiplexing optical signals of respective wavelengths transmitted from the optical selector, and
      wherein when a fault is detected in an optical signal of a certain wavelength included in optical signals transmitted from either one of systems, the optical selector only switches an optical signal of the wavelength in which the fault is detected, into the other system.

6. An optical wavelength multiplexing system including a plurality of input and output optical fibers for transmitting wavelength-multiplexed optical signals, for processing the optical signals for each wavelength, comprising:
   a transmission line duplexed into a first system and a second system, a protection switch having:
      a demultiplexer for demultiplexing optical signals to be inputted after their wavelengths have been multiplexed, into optical signals of respective wavelengths;
      an optical selector provided for each wavelength, for selecting optical signals outputted from either one of the duplexed nodes; and
      a multiplexer for multiplexing optical signals of respective wavelengths transmitted from the optical selector, and
      wherein when a fault is detected in an optical signal of a certain wavelength included in optical signals transmitted from either one of systems, the optical selector only switches an optical signal of the wavelength in which the fault is detected, into the other system.

7. The optical wavelength multiplexing system according to claim 6, wherein an optical signal distributor is provided at an output of the protection switch, and wavelength-multiplexed optical signals are distributed to duplexed optical nodes.

8. The optical wavelength multiplexing system according to claim 6, wherein optical signal distributors and duplexed protection switches are provided at the transmission line, and a wavelength-multiplexed optical signal is split by the optical distributor to be distributed to the duplexed protection switches.

9. The optical wavelength multiplexing system according to claim 6, wherein
   a node to which the transmission line is connected is duplexed into a third system and a fourth system,
   the protection switch has a configuration such that the demultiplexer and the optical selector are provided corresponding to the third system and the fourth system, and an optical distributor for splitting an optical signal outputted from the demultiplexer is provided for each wavelength between the demultiplexer and the optical selector, and thus-split optical signals are respectively distributed to the optical selectors provided corresponding to the third system and the fourth system.

10. An optical wavelength multiplexing system including a plurality of input and output optical fibers for transmitting the wavelength-multiplexed optical signals for processing the optical signals for each wavelength, comprising: a transmission line duplexed into a first system and a second system, a protection switch having:
   a transmission line duplexed into a first system and a second system, a protection swich having:
      a demultiplexer for demultiplex in optical signals to be inputted after their wavelengths have been multiplexed into optical signals of respective wavelengths;
      an optical selector provided for each wavelength, for selecting optical signals outputted from either one of the duplexed nodes; and
      wherein when a fault is detected in an optical signal of a certain wavelength included in optical signals transmitted from either one of systems, the optical selector only switches an optical signal of the wavelength in which the fault is detected, into the other system.

11. The optical wavelength multiplexing system according to clam 10, wherein
   a node to which the transmission line is connected is duplexed into a third system and a fourth system,
   the protection switch has a configuration such that the demultiplexer and the optical selector are provided corresponding to the third system and the fourth system, and an optical distributor for splitting an optical signal outputted from the demultiplexer is provided for each wavelength between the demultiplexer and the optical selector, and thus-split optical signals are respectively distributed to the optical selectors provided corresponding to the third system and the fourth system.

12. The optical wavelength multiplexing system including a plurality of input and output optical fibers for transmitting wavelength-multiplexed optical signals, for processing the optical signals for each wavelength, comprising:
   a filter for selecting an optical signal of a plurality of arbitrary wavelengths provided at a protection switch for switching systems of outputs of nodes duplexed into a first system and a second system, and
   wherein when a fault is detected in an optical signal of a certain wavelength included in optical signals transmitted from either one of systems, the filter only switches an optical signal of the wavelength in which the fault is detected, into the other system.

13. The optical wavelength multiplexing system according to clam 12, wherein the protection switch is configured by combining a two-input and two-output type multi-wavelength selection filter.

14. The optical wavelength multiplexing system according to claim 13, wherein a node and a transmission line of the optical wavelength multiplexing system are duplexed by combining the protection switches.

15. The optical wavelength multiplexing system according to claim 12, wherein the protection switch is configured by combining one-input and one-output type multi-wavelength selection filters and an optical coupler.

16. The optical, wavelength multiplexing system according to claim 15, wherein a node and a transmission line of the optical wavelength multiplexing system are duplexed by combining the protection switches.

17. The optical wavelength multiplexing system including a plurality of input and output optical fibers for transmitting the wavelength-multiplexed optical signals, for processing the optical signals for each wavelength, comprising:

a filter for selecting an optical signal of a plurality of arbitrary wavelengths provided at a protection switch for switching systems of transmission lines duplexed into a first system and a second system, and wherein when a fault is detected in an optical signal of a certain wavelength included in optical signals transmitted from either one of systems, the filter only switches an optical signal of the wavelength in which the fault is detected, into the other system.

18. The optical wavelength multiplexing system according to claim 17, wherein the protection switch is configured by combining two-input and two-output type multi-wavelength selection filter.

19. The optical wavelength multiplexing system according to claim 17, wherein the protection switch is configured by combining one-input and one-output type multi-wavelength selection filters and an optical coupler.

20. An optical wavelength multiplexing system having a transmission line for propagating an optical signal and nodes connected by the transmission line, the system having redundancy by being provided with a plurality of the transmission lines and a plurality of the nodes, the system comprising:

monitor means for monitoring a multiplexed-wavelength optical signal to be transmitted, for each wavelength;

switch means for switching an optical signal of a wavelength in which a fault occurs among optical signals outputted from the plurality of transmission lines or the plurality of nodes, to an optical signal outputted from the other transmission line or the other node.

21. The optical wavelength multiplexing system according to claim 20, wherein the switch means comprises an optical switch.

22. The optical wavelength multiplexing system according to claim 20, wherein the switch means comprises an optical gate.

23. The optical wavelength multiplexing system according to claim 20, wherein the switch means comprises an acousto-optical filter.

* * * * *

UNITED STATES PATENT AND TRADEMARK OFFICE
CERTIFICATE OF CORRECTION

PATENT NO. : 6,433,900 B1  
DATED : August 13, 2002  
INVENTOR(S) : Satoshi Kuroyanagi et al.

It is certified that error appears in the above-identified patent and that said Letters Patent is hereby corrected as shown below:

<u>Title page,</u>
Item [22], please correct the Filing Date to read -- January 13, 1999. --

Signed and Sealed this

Twelfth Day of November, 2002

*Attest:*

*Attesting Officer*

JAMES E. ROGAN
*Director of the United States Patent and Trademark Office*